US 9,014,916 B2

(12) United States Patent
Tokimasa et al.

(10) Patent No.: US 9,014,916 B2
(45) Date of Patent: *Apr. 21, 2015

(54) VEHICLE DYNAMIC CONTROL APPARATUS AND VEHICLE DYNAMIC CONTROL SYSTEM USING THE SAME

(75) Inventors: Mitsuhiro Tokimasa, Obu (JP); Yasuhiko Mukai, Anjo (JP); Junpei Tatsukawa, Chiryu (JP); Masaki Maruyama, Nagoya (JP); Masatoshi Hanzawa, Kariya (JP); Hirofumi Nitta, Obu (JP); Yuichi Mizutani, Aichi-ken (JP)

(73) Assignees: Denso Corporation, Kariya (JP); Advics Co., Ltd, Kariya (JP); Aisin Seiki Kabushiki Kaisha, Kariya (JP)

( * ) Notice: Subject to any disclaimer, the term of this patent is extended or adjusted under 35 U.S.C. 154(b) by 552 days.

This patent is subject to a terminal disclaimer.

(21) Appl. No.: 13/282,674

(22) Filed: Oct. 27, 2011

(65) Prior Publication Data

US 2012/0109460 A1 May 3, 2012

(30) Foreign Application Priority Data

Oct. 29, 2010 (JP) .................. 2010-244535
Oct. 29, 2010 (JP) .................. 2010-244537
Oct. 29, 2010 (JP) .................. 2010-244548

(51) Int. Cl.
*G06F 17/00* (2006.01)
*B60W 50/04* (2006.01)
(Continued)

(52) U.S. Cl.
CPC ........... *B60W 50/045* (2013.01); *B60W 10/184* (2013.01); *B60W 10/20* (2013.01); *B60W 30/02* (2013.01); *B60W 50/035* (2013.01); *B60W 50/14* (2013.01); *B60W 2050/0095* (2013.01)

(58) Field of Classification Search
CPC ............ G06F 7/00; G06F 17/00; G06F 19/00
USPC ........ 701/1, 22, 36, 41, 70, 79, 84, 121, 29.1, 701/29.2
See application file for complete search history.

(56) References Cited

U.S. PATENT DOCUMENTS 7,162,333 B2    1/2007  Koibuchi et al.
2002/0099487 A1*  7/2002  Suganuma et al. ............. 701/48
(Continued)

FOREIGN PATENT DOCUMENTS

JP          63-182709         7/1988
JP          63-271540         11/1988
(Continued)

OTHER PUBLICATIONS

Final Office Action issued Feb. 21, 2014 in co-pending U.S. Appl. No. 13/282,601.

(Continued)

*Primary Examiner* — Kim T Nguyen
(74) *Attorney, Agent, or Firm* — Harness, Dickey & Pierce, PLC

(57) ABSTRACT

A vehicle dynamic control apparatus is designed to control a plurality of controlled objects according to a request value of a first parameter from an application associated with motion of a vehicle in a same direction to fulfill the request value of the first parameter. An availability obtainer obtains an availability corresponding to a controllable range of a second parameter of each of the plurality of controlled objects, the second parameter being associated with motion of the vehicle in the same direction. A selector determines an order of the plurality of controlled objects to be controlled based on the availability of the second parameter of each of the plurality of controlled objects, and selects at least one of the plurality of controlled objects to be controlled in accordance with the determined order.

12 Claims, 18 Drawing Sheets

(51) Int. Cl.
    *B60W 10/184*    (2012.01)
    *B60W 10/20*     (2006.01)
    *B60W 30/02*     (2012.01)
    *B60W 50/035*    (2012.01)
    *B60W 50/14*     (2012.01)
    *B60W 50/00*     (2006.01)

(56) References Cited

U.S. PATENT DOCUMENTS

| | | | |
|---|---|---|---|
| 2002/0143451 A1 | 10/2002 | Hac et al. | |
| 2004/0083043 A1 | 4/2004 | Akiyama et al. | |
| 2004/0128044 A1* | 7/2004 | Hac | 701/48 |
| 2005/0027402 A1 | 2/2005 | Koibuchi et al. | |
| 2005/0154506 A1 | 7/2005 | Takamatsu | |
| 2005/0171669 A1 | 8/2005 | Sato | |
| 2005/0203646 A1 | 9/2005 | Makino et al. | |
| 2006/0208564 A1 | 9/2006 | Yuda et al. | |
| 2007/0004553 A1 | 1/2007 | Oikawa et al. | |
| 2007/0083315 A1 | 4/2007 | Takamatsu et al. | |
| 2007/0088484 A1 | 4/2007 | Fujita | |
| 2007/0112483 A1 | 5/2007 | Jeong | |
| 2007/0138986 A1 | 6/2007 | Kutsuna et al. | |
| 2010/0241289 A1 | 9/2010 | Sandberg | |
| 2011/0144885 A1 | 6/2011 | Ohtsuka et al. | |
| 2011/0307152 A1 | 12/2011 | Shono et al. | |
| 2012/0109411 A1* | 5/2012 | Tokimasa et al. | 701/1 |
| 2012/0109414 A1 | 5/2012 | Kumabe et al. | |

FOREIGN PATENT DOCUMENTS

| | | |
|---|---|---|
| JP | 06-032242 | 2/1994 |
| JP | 11-031011 | 2/1999 |
| JP | 2003-159966 | 6/2003 |
| JP | 2003-191774 | 7/2003 |
| JP | 2005-161997 | 6/2005 |
| JP | 2005-180344 | 7/2005 |
| JP | 2005-193811 | 7/2005 |
| JP | 2005-219541 | 8/2005 |
| JP | 2005-255037 | 9/2005 |
| JP | 2009-068402 | 4/2009 |
| JP | 4297150 | 4/2009 |
| JP | 2009-137582 | 6/2009 |
| JP | 4455379 | 2/2010 |
| JP | 2010-053705 | 3/2010 |
| JP | 2010-115959 | 5/2010 |
| WO | WO 2010/089848 | 8/2010 |

OTHER PUBLICATIONS

Office Action issued Feb. 25, 2014 in co-pending U.S. Appl. No. 13/282,626.
Office Action issued Oct. 8, 2013 in co-pending U.S. Appl. No. 13/282,601.
Office Action issued Mar. 11, 2013 in co-pending U.S. Appl. No. 13/282,626.
Office Action dated Mar. 18, 2014 in corresponding Japanese Application No. 2010-244534.
Office Action dated Mar. 18, 2014 in corresponding Japanese Application No. 2010-244535.
Office Action dated Mar. 18, 2014 in corresponding Japanese Application No. 2010-244537.
Office Action dated Mar. 19, 2014 in corresponding Chinese Application No. 201110354280.2.
Office Action dated Mar. 25, 2014 in corresponding Japanese Application No. 2010-244536.

* cited by examiner

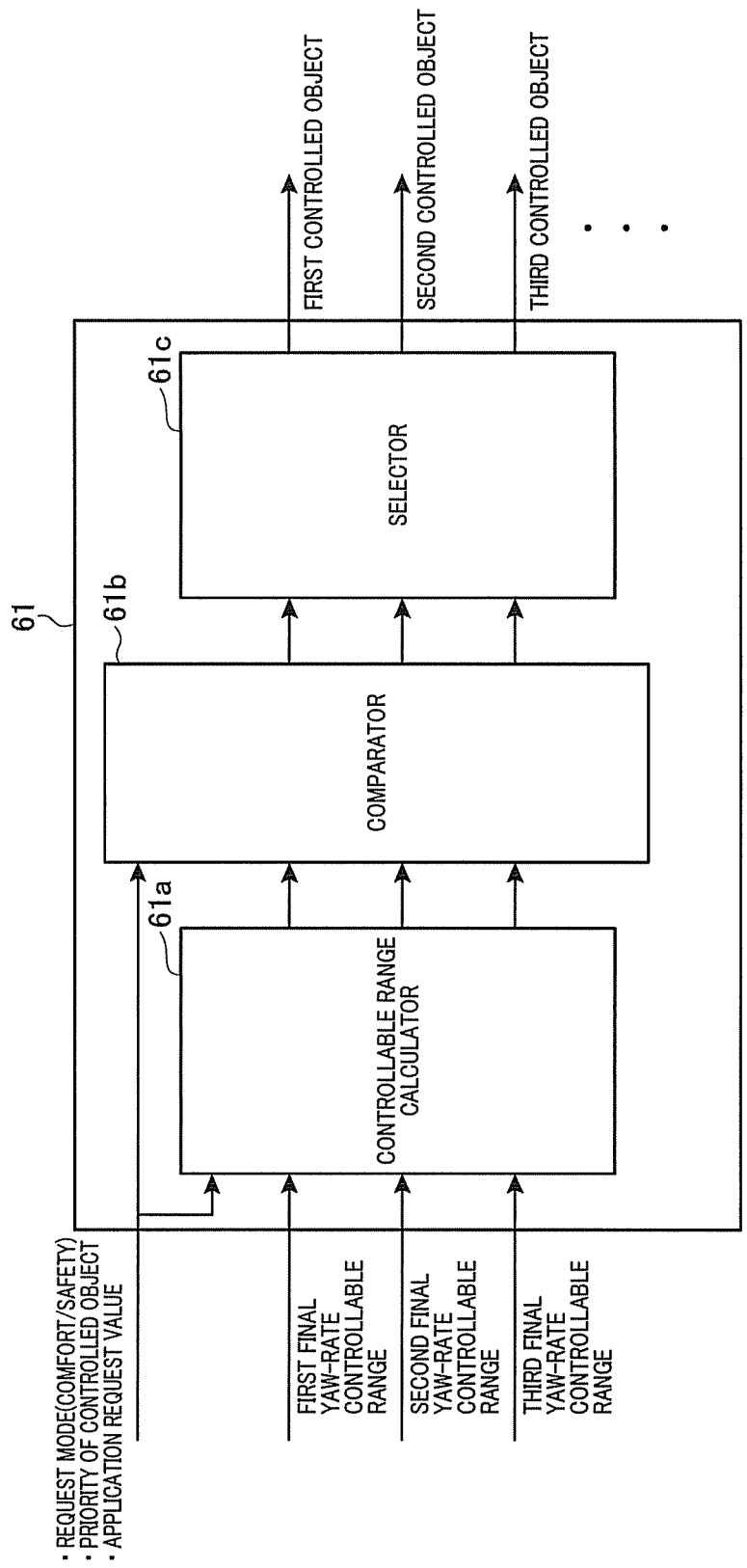

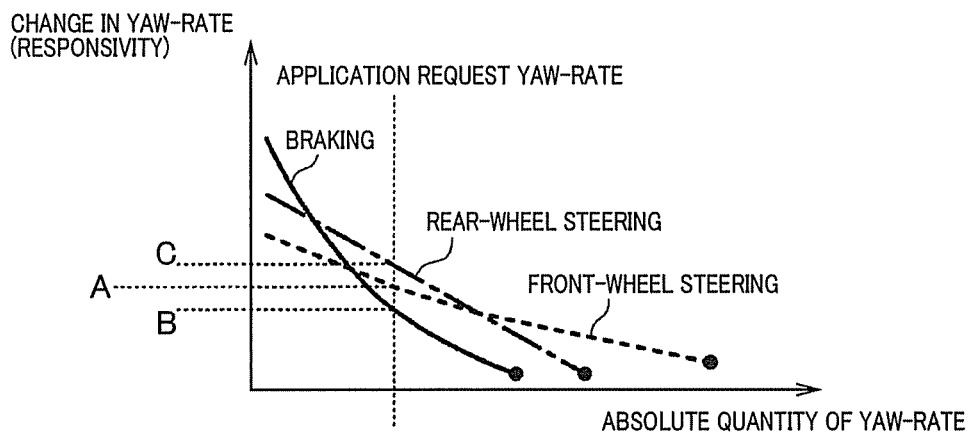
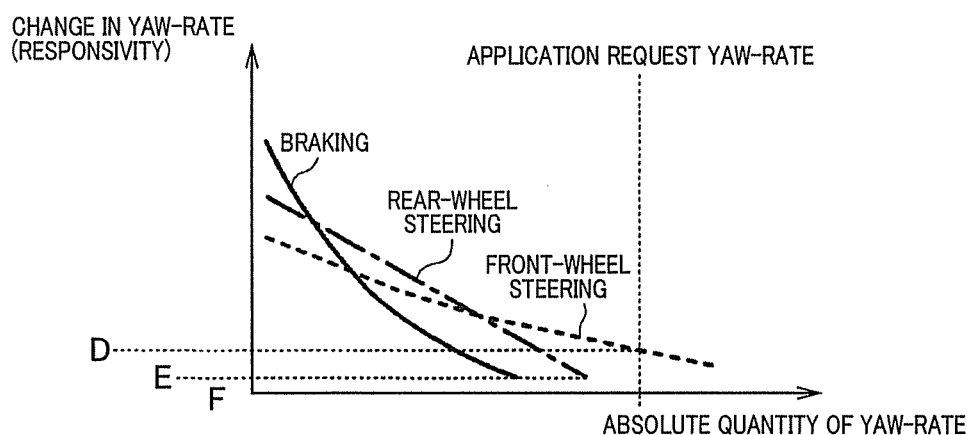

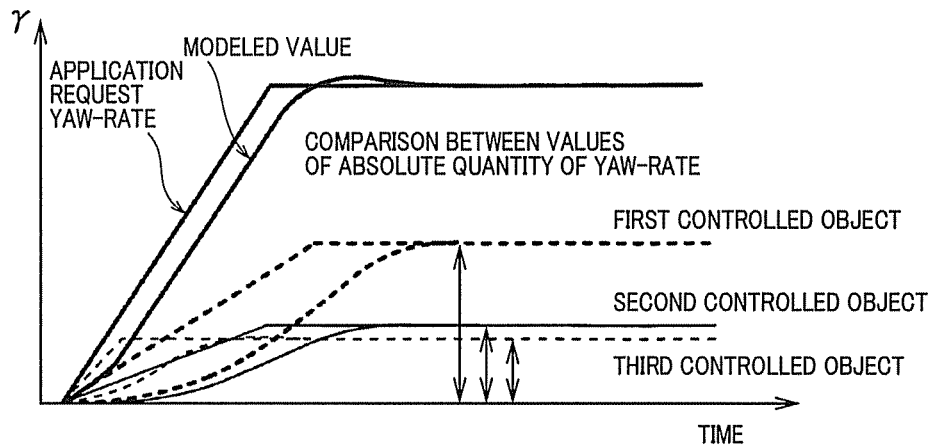
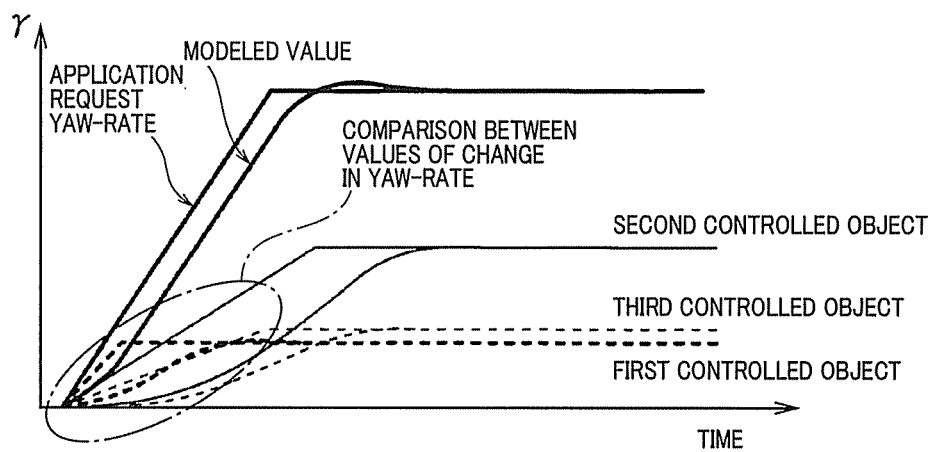

FIG. 7A

| SELECTION OF FIRST CONTROLLED OBJECT \ APPLICATION-REQUEST YAW-RATE | 7: ALL FULFILLMENT | 6: REAR WHEEL STEERING OR BRAKING | 5: REAR WHEEL STEERING OR FRONT WHEEL STEERING | 3: FRONT WHEEL STEERING OR BRAKING | 4: REAR-WHEEL STEERING | 2: BRAKING | 1: FRONT-WHEEL STEERING | 0: ALL UNFULFILLMENT |
|---|---|---|---|---|---|---|---|---|
| 7: ALL FULFILLMENT | — | 6: REAR WHEEL STEERING OR BRAKING | 5: REAR WHEEL STEERING OR FRONT WHEEL STEERING | 3: FRONT WHEEL STEERING OR BRAKING | 4: REAR-WHEEL STEERING | 2: BRAKING | 1: FRONT-WHEEL STEERING | 0: ALL UNFULFILLMENT |
| 6: REAR WHEEL STEERING OR BRAKING | 4: SELECTION OF MAXIMUM CHANGE | 7: FRONT-WHEEL STEERING OR REAR-WHEEL STEERING WITH HIGHER VALUE | 6: BRAKING OR REAR-WHEEL STEERING WITH HIGHER VALUE | 5: FRONT-WHEEL STEERING OR BRAKING WITH HIGHER VALUE | 3: REAR-WHEEL STEERING | 2: BRAKING | 1: FRONT-WHEEL STEERING | 8: FRONT OR REAR WHEEL STEERING OR BRAKING WITH HIGHER VALUE |
| 5: REAR WHEEL STEERING OR FRONT WHEEL STEERING | 4: SELECTION OF MAXIMUM CHANGE | 4: SELECTION OF MAXIMUM CHANGE | 3: REAR-WHEEL STEERING | 2: BRAKING | 3: REAR-WHEEL STEERING | 2: BRAKING | 4: SELECTION OF MAXIMUM CHANGE | 7: BRAKING OR REAR-WHEEL STEERING WITH HIGHER VALUE |
| 3: FRONT WHEEL STEERING OR BRAKING | 4: SELECTION OF MAXIMUM CHANGE | 4: SELECTION OF MAXIMUM CHANGE | 3: REAR-WHEEL STEERING | 1: FRONT-WHEEL STEERING | 3: REAR-WHEEL STEERING | 4: SELECTION OF MAXIMUM CHANGE | 1: FRONT-WHEEL STEERING | 6: FRONT OR REAR WHEEL STEERING WITH HIGHER VALUE |
| 4: REAR-WHEEL STEERING | 4: SELECTION OF MAXIMUM CHANGE | 3: REAR-WHEEL STEERING | 1: FRONT-WHEEL STEERING | 4: SELECTION OF MAXIMUM CHANGE | 4: SELECTION OF MAXIMUM CHANGE | 3: REAR-WHEEL STEERING | 1: FRONT-WHEEL STEERING | 5: REAR WHEEL STEERING OR FRONT WHEEL STEERING |
| 2: BRAKING | 3: REAR-WHEEL STEERING | 3: REAR-WHEEL STEERING | 3: REAR-WHEEL STEERING | 1: FRONT-WHEEL STEERING | 3: REAR-WHEEL STEERING | 2: BRAKING | 3: REAR-WHEEL STEERING | 3: REAR-WHEEL STEERING |
| 1: FRONT-WHEEL STEERING | 2: BRAKING | 2: BRAKING | 2: BRAKING | 2: BRAKING | 2: BRAKING | 2: BRAKING | 1: FRONT-WHEEL STEERING | 2: BRAKING |
| 0: ALL UNFULFILLMENT | 4: SELECTION OF MAXIMUM CHANGE | 4: SELECTION OF MAXIMUM CHANGE | 4: SELECTION OF MAXIMUM CHANGE | 4: SELECTION OF MAXIMUM CHANGE | 4: SELECTION OF MAXIMUM CHANGE | 4: SELECTION OF MAXIMUM CHANGE | 4: SELECTION OF MAXIMUM CHANGE | 4: SELECTION OF MAXIMUM CHANGE |

(Row axis: APPLICATION-REQUEST CHANGE IN YAW-RATE)

FIG. 7B

| SELECTION OF SECOND CONTROLLED OBJECT / APPLICATION-REQUEST CHANGE IN YAW-RATE | APPLICATION-REQUEST YAW-RATE | | | | | | | |
|---|---|---|---|---|---|---|---|---|
| | 7: ALL FULFILLMENT | 6: REAR WHEEL STEERING OR BRAKING | 5: REAR WHEEL STEERING OR FRONT WHEEL STEERING | 3: FRONT WHEEL STEERING OR BRAKING | 4: REAR-WHEEL STEERING | 2: BRAKING | 1: FRONT-WHEEL STEERING | 0: ALL UNFULFILLMENT |
| 7: ALL FULFILLMENT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | 6: SELECTION OF MAXIMUM VALUE EXCEPT FOR FIRST |
| 6: REAR WHEEL STEERING OR BRAKING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | 6: SELECTION OF MAXIMUM VALUE EXCEPT FOR FIRST |
| 5: REAR WHEEL STEERING OR FRONT WHEEL STEERING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | 2: BRAKING | 1: FRONT-WHEEL STEERING | 6: SELECTION OF MAXIMUM VALUE EXCEPT FOR FIRST |
| 3: FRONT WHEEL STEERING OR BRAKING | NO SECOND CONTROLLED OBJECT | NO SECOND CONTROLLED OBJECT | NO SECOND CONTROLLED OBJECT | NO SECOND CONTROLLED OBJECT | 3: REAR-WHEEL STEERING | NO SECOND CONTROLLED OBJECT | NO SECOND CONTROLLED OBJECT | 6: SELECTION OF MAXIMUM VALUE EXCEPT FOR FIRST |
| 4: REAR-WHEEL STEERING | NO SECOND CONTROLLED OBJECT | NO SECOND CONTROLLED OBJECT | 5: SELECTION OF MAXIMUM VALUE | 5: SELECTION OF MAXIMUM VALUE | NO SECOND CONTROLLED OBJECT | 2: BRAKING | 1: FRONT-WHEEL STEERING | 5: SELECTION OF MAXIMUM VALUE |
| 2: BRAKING | NO SECOND CONTROLLED OBJECT | NO SECOND CONTROLLED OBJECT | NO SECOND CONTROLLED OBJECT | NO SECOND CONTROLLED OBJECT | 3: REAR-WHEEL STEERING | NO SECOND CONTROLLED OBJECT | 1: FRONT-WHEEL STEERING | 5: SELECTION OF MAXIMUM VALUE |
| 1: FRONT-WHEEL STEERING | NO SECOND CONTROLLED OBJECT | 5: SELECTION OF MAXIMUM VALUE | 5: SELECTION OF MAXIMUM VALUE | NO SECOND CONTROLLED OBJECT | 3: REAR-WHEEL STEERING | 2: BRAKING | NO SECOND CONTROLLED OBJECT | 5: SELECTION OF MAXIMUM VALUE |
| 0: ALL UNFULFILLMENT | 4: SELECTION OF SECOND CHANGE | 4: SELECTION OF SECOND CHANGE | 4: SELECTION OF SECOND CHANGE | 4: SELECTION OF SECOND CHANGE | 4: SELECTION OF SECOND CHANGE | 4: SELECTION OF SECOND CHANGE | 4: SELECTION OF SECOND CHANGE | 4: SELECTION OF SECOND CHANGE |

| SELECTION OF FIRST CONTROLLED OBJECT / APPLICATION-REQUEST CHANGE IN YAW-RATE | APPLICATION-REQUEST YAW-RATE | | | | | | | | |
|---|---|---|---|---|---|---|---|---|---|
| | 7: ALL FULFILLMENT | 6: REAR WHEEL STEERING OR BRAKING | 5: REAR WHEEL STEERING OR FRONT WHEEL STEERING | 3: FRONT WHEEL STEERING OR BRAKING | 4: REAR-WHEEL STEERING | 2: BRAKING | 1: FRONT-WHEEL STEERING | 0: ALL UNFULFILLMENT |
| 7: ALL FULFILLMENT | 4: SELECTION OF MAXIMUM VALUE | 7: FRONT-WHEEL STEERING OR REAR-WHEEL STEERING WITH HIGHER CHANGE | 6: BRAKING OR REAR-WHEEL STEERING WITH HIGHER CHANGE | 5: FRONT-WHEEL STEERING OR BRAKING WITH HIGHER CHANGE | 3: REAR-WHEEL STEERING | 2: BRAKING | 1: FRONT-WHEEL STEERING | 8: FRONT OR REAR WHEEL STEERING OR BRAKING WITH HIGHER VALUE |
| 6: REAR WHEEL STEERING OR BRAKING | 4: SELECTION OF MAXIMUM VALUE | 4: SELECTION OF MAXIMUM CHANGE | 3: REAR-WHEEL STEERING | 2: BRAKING | 3: REAR-WHEEL STEERING | 2: BRAKING | 1: FRONT-WHEEL STEERING | 7: BRAKING OR REAR-WHEEL STEERING WITH HIGHER CHANGE |
| 5: REAR WHEEL STEERING OR FRONT WHEEL STEERING | 4: SELECTION OF MAXIMUM VALUE | 3: REAR-WHEEL STEERING | 4: SELECTION OF MAXIMUM VALUE | 1: FRONT-WHEEL STEERING | 3: REAR-WHEEL STEERING | 2: BRAKING | 1: FRONT-WHEEL STEERING | 6: FRONT OR REAR WHEEL STEERING WITH HIGHER CHANGE |
| 3: FRONT WHEEL STEERING OR BRAKING | 4: SELECTION OF MAXIMUM VALUE | 2: BRAKING | 1: FRONT-WHEEL STEERING | 4: SELECTION OF MAXIMUM VALUE | 4: SELECTION OF MAXIMUM VALUE | 2: BRAKING | 1: FRONT-WHEEL STEERING | 5: REAR WHEEL STEERING OR FRONT WHEEL STEERING |
| 4: REAR-WHEEL STEERING | 3: REAR-WHEEL STEERING | 3: REAR-WHEEL STEERING | 3: REAR-WHEEL STEERING | 3: REAR-WHEEL STEERING | 3: REAR-WHEEL STEERING | 2: BRAKING | 3: REAR-WHEEL STEERING | 3: REAR-WHEEL STEERING |
| 2: BRAKING | 2: BRAKING | 2: BRAKING | 2: BRAKING | 2: BRAKING | 2: BRAKING | 2: BRAKING | 2: BRAKING | 2: BRAKING |
| 1: FRONT-WHEEL STEERING | 1: FRONT-WHEEL STEERING | 1: FRONT-WHEEL STEERING | 1: FRONT-WHEEL STEERING | 1: FRONT-WHEEL STEERING | 1: FRONT-WHEEL STEERING | 1: FRONT-WHEEL STEERING | 1: FRONT-WHEEL STEERING | 1: FRONT-WHEEL STEERING |
| 0: ALL UNFULFILLMENT | 4: SELECTION OF MAXIMUM CHANGE | 4: SELECTION OF MAXIMUM VALUE | 4: SELECTION OF MAXIMUM VALUE | 4: SELECTION OF MAXIMUM VALUE | 4: SELECTION OF MAXIMUM VALUE | 4: SELECTION OF MAXIMUM VALUE | 4: SELECTION OF MAXIMUM VALUE | 4: SELECTION OF MAXIMUM VALUE |

| | | APPLICATION-REQUEST YAW-RATE | | | | | | | |
|---|---|---|---|---|---|---|---|---|---|
| | | 7: ALL FULFILLMENT | 6: REAR WHEEL STEERING OR BRAKING | 5: REAR WHEEL STEERING OR FRONT WHEEL STEERING | 4: REAR-WHEEL STEERING | 3: FRONT WHEEL STEERING OR BRAKING | 2: BRAKING | 1: FRONT-WHEEL STEERING | 0: ALL UNFULFILLMENT |
| APPLICATION-REQUEST CHANGE IN YAW-RATE / SELECTION OF THIRD CONTROLLED OBJECT | 7: ALL FULFILLMENT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | THIRD CONTROLLED OBJECT FOR CHANGE IN YAW-RATE |
| | 6: REAR WHEEL STEERING OR BRAKING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO THIRD CONTROLLED OBJECT | THIRD CONTROLLED OBJECT FOR CHANGE IN YAW-RATE |
| | 5: REAR WHEEL STEERING OR FRONT WHEEL STEERING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO THIRD CONTROLLED OBJECT | NO SECOND CONTROLLED OBJECT | THIRD CONTROLLED OBJECT FOR CHANGE IN YAW-RATE |
| | 3: FRONT WHEEL STEERING OR BRAKING | NO SECOND CONTROLLED OBJECT | NO SECOND CONTROLLED OBJECT | NO SECOND CONTROLLED OBJECT | NO THIRD CONTROLLED OBJECT | NO SECOND CONTROLLED OBJECT | NO THIRD CONTROLLED OBJECT | NO THIRD CONTROLLED OBJECT | THIRD CONTROLLED OBJECT FOR CHANGE IN YAW-RATE |
| | 4: REAR-WHEEL STEERING | NO SECOND CONTROLLED OBJECT | NO SECOND CONTROLLED OBJECT | NO SECOND CONTROLLED OBJECT | NO THIRD CONTROLLED OBJECT | NO THIRD CONTROLLED OBJECT | NO THIRD CONTROLLED OBJECT | NO THIRD CONTROLLED OBJECT | THIRD CONTROLLED OBJECT FOR CHANGE IN YAW-RATE |
| | 2: BRAKING | NO SECOND CONTROLLED OBJECT | NO SECOND CONTROLLED OBJECT | NO THIRD CONTROLLED OBJECT | NO THIRD CONTROLLED OBJECT | NO THIRD CONTROLLED OBJECT | NO THIRD CONTROLLED OBJECT | NO THIRD CONTROLLED OBJECT | THIRD CONTROLLED OBJECT FOR CHANGE IN YAW-RATE |
| | 1: FRONT-WHEEL STEERING | NO SECOND CONTROLLED OBJECT | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR CHANGE IN YAW-RATE |
| | 0: ALL UNFULFILLMENT | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR YAW-RATE |

FIG.9

LEVEL OF DECELERATION
WHEN OUTPUTTING 0.0025 rad/s
DECELERATION BY CONTROL OF BRAKING 0.1 [m/s$^2$]
DECELERATION BY CONTROL OF FRONT-WHEEL STEERING 0.001 [m/s$^2$]
DECELERATION BY CONTROL OF REAR-WHEEL STEERING 0.0025 [m/s$^2$]

⋮

LEVEL OF DECELERATION
WHEN OUTPUTTING 0.1 rad/s
DECELERATION BY CONTROL OF BRAKING 4.0 [m/s$^2$]
DECELERATION BY CONTROL OF FRONT-WHEEL STEERING 0.04 [m/s$^2$]
DECELERATION BY CONTROL OF REAR-WHEEL STEERING 0.1 [m/s$^2$]

⋮

LEVEL OF DECELERATION
WHEN OUTPUTTING 0.25 rad/s
DECELERATION BY CONTROL OF BRAKING 10.0 [m/s$^2$]
DECELERATION BY CONTROL OF FRONT-WHEEL STEERING 0.1 [m/s$^2$]
DECELERATION BY CONTROL OF REAR-WHEEL STEERING 0.25 [m/s$^2$]

VEHICLE DYNAMIC CONTROL APPARATUS AND VEHICLE DYNAMIC CONTROL SYSTEM USING THE SAME

CROSS REFERENCE TO RELATED APPLICATIONS

This application is based on Japanese Patent Applications 2010-244548, 2010-244537, and 2010-244535 filed on Oct. 29, 2010. This application claims the benefit of priority from the Japanese Patent Application, so that the descriptions of which are all incorporated herein by reference.

TECHNICAL FIELD

The present disclosure relates to vehicle dynamic control apparatuses that perform dynamic control of a vehicle while controlling, in cooperation, a plurality of controlled objects, and to vehicle dynamic control systems each equipped with such a vehicle dynamic control apparatus.

BACKGROUND

US Patent Application Publication No. 2007/0088484 corresponding to Japanese Patent Publication No. 4297150, referred to as a first publication, discloses a vehicle that changes motive power distribution to the front wheels and to the rear wheels according to the amount of understeer or oversteer as an example of lateral motions of the vehicle, and thereafter corrects the steering angles if the amount of understeer or oversteer increases. Thereafter, the vehicle also brakes a selected wheel if the amount of understeer or oversteer increases.

US Patent Application Publication No. 2006/0208564 corresponding to Japanese Patent Publication No. 4455379, referred to as a second publication, discloses an understeer control apparatus. The understeer control apparatus successively carries out reduction in reactive force by an electric power steering device, generation of an alert by an alerting device, and control of braking force distribution to the wheels.

SUMMARY

The vehicle disclosed in the first publication only determines a plurality of controlled objects to be used, and the order of the determined controlled objects to be activated in achieving values of controlled variables required to eliminate understeer or oversteer.

The understeer control apparatus disclosed in the second publication only successively activates a plurality of controlled objects to gradually compensate insufficient controlled variables in order to achieve values of the controlled variables required to reduce understeer.

Specifically, although any of the first and second publications discloses control of lateral motions of a vehicle while controlling, in cooperation, a plurality of controlled objects, it fails to consider the controllable range of each of the plurality of controlled objects, and therefore fails to determine a control request to each of the plurality of controlled objects according to the controllable range for a corresponding one of the plurality of controlled objects. Thus, any of the first and second publications may cause a control request to a controlled object to exceed performance limitations to be achieved by the controlled object in controlling lateral motions of a vehicle.

In addition, because of no consideration of the controllable range of each of the plurality of controlled objects, any of the first and second publications fails to consider which of the plurality of controlled objects is preferentially activated according to the controllable range of each of the plurality of controlled objects in order to achieve more optimal control of lateral motions of a vehicle.

For example, if the magnitude of a controlled variable, which is as an example of parameters indicative of the controllable range of the controlled variable, of each controlled object is different from the others, determination of one of the plurality of controlled objects based on only the magnitude of the controlled variable may not select a more optimum controlled object with higher response relative to the others, especially in the event of emergency. Thus, it is desired to optimally control lateral motions of a vehicle using a plurality of controlled objects.

Similar to the lateral motions of a vehicle, it is desired to prevent a control request to a controlled object from exceeding performance limitations to be achieved by the controlled object in controlling longitudinal motions and/or pitching motions of a vehicle.

In view of the circumstances set forth above, one aspect of the present disclosure seeks to provide vehicle dynamic control apparatuses, which are designed to address at least one of the problems set forth above.

Specifically, an alternative aspect of the present disclosure aims to provide such vehicle dynamic control apparatuses capable of preventing a control request to a controlled object from exceeding performance limitations to be achieved by the controlled object in controlling the dynamics of a vehicle.

In addition, a further aspect of the present disclosure aims to provide such vehicle dynamic control apparatuses capable of more optimally controlling the dynamics of a vehicle according to controllable range of each of a plurality of controlled objects.

According to one aspect of the present disclosure, there is provided a vehicle dynamic control apparatus for controlling a plurality of controlled objects according to a request value of a first parameter from an application associated with motion of a vehicle in a same direction to fulfill the request value of the first parameter. The vehicle dynamic control apparatus includes an availability obtainer configured to obtain an availability corresponding to a controllable range of a second parameter of each of the plurality of controlled objects, the second parameter being associated with motion of the vehicle in the same direction. The vehicle dynamic control apparatus includes a selector configured to determine an order of the plurality of controlled objects to be controlled based on the availability of the second parameter of each of the plurality of controlled objects, and select at least one of the plurality of controlled objects to be controlled in accordance with the determined order.

In the present disclosure, the term "availability" means a controllable range. That is, all words and phrases using the "availability" can be replaced with words and phrases using the "controllable range". Similarly, all words and phrases using the "controllable range" can be replaced with words and phrases using the "availability".

With the configuration of the vehicle dynamic control apparatus according to the one aspect of the present disclosure, the selector determines the order of the plurality of controlled objects to be controlled based on the availability of the second parameter of each of the plurality of controlled objects. Thus, it is possible to optimally select at least one of the plurality of controlled objects so as to satisfy the availability of the second parameter of each of the plurality of controlled objects.

Note that the first parameter can be physically identical to the second parameter, or can be physically different from the second parameter.

In a preferred embodiment of this one aspect, a changing unit is configured to change, according to at least one of: a control request associated with motion of the vehicle from the application; and vehicle information indicative of current conditions of the vehicle, the availability of the second parameter of at least one controlled object in the plurality of controlled objects. The selector is configured to determine the order of the plurality of controlled objects to be controlled based on the availability of the second parameter of each of the plurality of controlled objects including the changed availability of the second parameter of the at least one controlled object, and select at least one of the plurality of controlled objects to be controlled in accordance with the determined order.

That is, the changing unit changes the availability of the second parameter of at least one controlled object in the plurality of controlled objects so as to meet the at least one of: the control request associated with motion of the vehicle from the application; and the vehicle information indicative of the current conditions of the vehicle.

In a preferred embodiment of the one aspect, the changing unit includes a first changing section configured to change, according to the control request associated with motion of the vehicle from the application, the availability of the second parameter of a first controlled object, as the at least one controlled object, in the plurality of controlled objects; and a second changing section configured to change, according to the vehicle information indicative of the current conditions of the vehicle, the availability of the second parameter of a second controlled object, as the at least one controlled object, in the plurality of controlled objects. The selector is configured to determine the order of the plurality of controlled objects to be controlled based on the availability of the second parameter of each of the plurality of controlled objects including the changed availability of each of the first and second controlled objects, and select the at least one of the plurality of controlled objects to be controlled in accordance with the determined order.

Note that the first controlled object and the second controlled object can be the same as each other, or can be different from each other.

According to an alternative aspect of the present disclosure, there is provided a vehicle dynamic control apparatus for performing feedforward control and feedback control of a plurality of controlled objects according to a request value of a first parameter associated with motion of a vehicle in a same direction to fulfill the request value of the first parameter. The vehicle dynamic control apparatus includes an availability obtainer configured to obtain an availability corresponding to a controllable range of a second parameter of each of the plurality of controlled objects, the second parameter being associated with motion of the vehicle in the same direction. The vehicle dynamic control apparatus includes a first selector configured to determine an order of the plurality of controlled objects to be used by the feedforward control based on the availability of the second parameter of each of the plurality of controlled objects, and select, as at least one first controlled object, at least one of the plurality of controlled objects in accordance with the determined order. The vehicle dynamic control apparatus includes a feedforward calculator configured to calculate, based on the request value of the first parameter, a feedforward request value used by the feedforward control of the selected at least one first controlled object, and a margin calculator configured to calculate a margin of each of the plurality of controlled objects based on the feedforward request value and the availability of the second parameter of each of the plurality of controlled objects. The vehicle dynamic control apparatus includes a second selector configured to determine an order of the plurality of controlled objects to be used by the feedback control based on the margin of each of the plurality of controlled objects, and select, as at least one second controlled object, at least one of the plurality of controlled objects in accordance with the determined order.

With the configuration of the vehicle dynamic control apparatus according to the alternative aspect of the present disclosure, the second selector determines the order of the plurality of controlled objects to be used by the feedback control based on the margin of each of the plurality of controlled objects. This makes it possible to select at least one of the plurality of controlled objects in accordance with the determined order to be suitable for the differences between the margins of the plurality of controlled objects.

According to a further aspect of the present disclosure, there is provided a vehicle dynamic control apparatus for performing feedforward control and feedback control of a plurality of controlled objects according to a request value of a first parameter associated with motion of a vehicle in a same direction to fulfill the request value of the first parameter. The vehicle dynamic control apparatus includes an availability obtainer configured to obtain an availability corresponding to a controllable range of a second parameter of each of the plurality of controlled objects, the second parameter being associated with motion of the vehicle in the same direction. The vehicle dynamic control apparatus includes a first selector configured to determine an order of the plurality of controlled objects to be used by the feedforward control based on the availability of the second parameter of each of the plurality of controlled objects, and select, as at least one first controlled object, at least one of the plurality of controlled objects in accordance with the determined order. The vehicle dynamic control apparatus includes a second selector configured to select, as at least one second controlled object, at least one of the plurality of controlled objects to be used by the feedback control such that the selected at least one second controlled object is the same as the selected at least one first controlled object.

The configuration of the vehicle dynamic control apparatus according to the alternative aspect of the present disclosure allows the selected at least one second controlled object for the feedback control to be matched with the selected at least one first controlled object for the feedforward control. This reduces a number of controlled objects to be used for both the feedforward control and the feedback control. This makes it possible to prevent redundant selection of controlled objects.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of an embodiment with reference to the accompanying drawings in which:

FIG. 3 is a block diagram illustrating the detailed structure of a controlled object selector illustrated in FIG. 1;

FIG. 4A is a graph schematically illustrating an example of a selected result by a controllable range calculator illustrated in FIG. 3 when an application request mode is set to a comfort mode;

FIG. 4B is a graph schematically illustrating an alternative example of a selected result by the controllable range calculator when the application request mode is set to the comfort mode;

FIG. 6A is a graph schematically illustrating one example of the order of selection of a plurality of controlled objects if a selected application request mode is the comfort mode;

FIG. 6B is a graph schematically illustrating one example of the order of selection of the plurality of controlled objects if the selected application request mode is the safety mode;

FIG. 7A is a map to be used, in the comport mode as the application request mode, for selection of a first controlled object having the highest priority in the plurality of controlled objects;

FIG. 7B is a map to be used, in the comport mode as the application request mode, for selection of a second controlled object having the next higher priority in the plurality of controlled objects;

FIG. 7C is a map to be used, in the comport mode as the application request mode, for selection of a third controlled object having the third higher priority in the plurality of controlled objects;

FIG. 8A is a map to be used, in the safety mode as the application request mode, for selection of a first controlled object having the highest priority in the plurality of controlled objects;

FIG. 8B is a map to be used, in the safety mode as the application request mode, for selection of a second controlled object having the next higher priority in the plurality of controlled objects;

FIG. 8C is a map to be used, in the safety mode as the application request mode, for selection of a third controlled object having the third higher priority in the plurality of controlled objects;

FIG. 9 is a view schematically illustrating an example of a yaw-rate-deceleration map according to the first embodiment;

DETAILED DESCRIPTION OF EMBODIMENT

Figure 1:
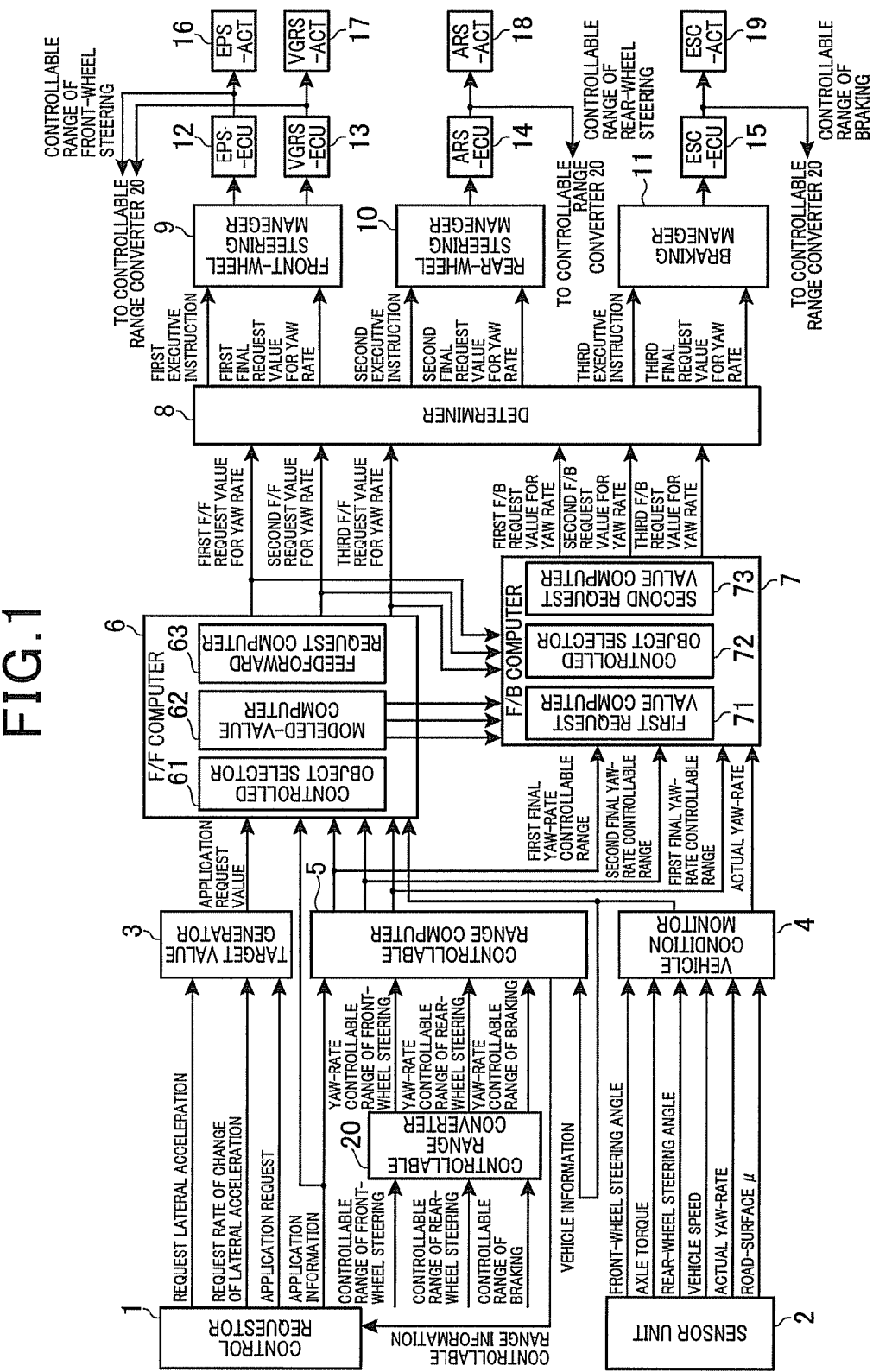
FIG. 1 is a block diagram schematically illustrating an example of the overall structure of a lateral-motion control system according to a first embodiment of the present disclosure.

Embodiments of the present disclosure will be described hereinafter with reference to the accompanying drawings. In the embodiments, like parts between the embodiments, to which like reference characters are assigned, are omitted or simplified in redundant description.

As described above, in the following embodiments, the term "availability" is equivalent to the term "controllable range". Thus, the words and phrases using the term "controllable range" can be replaced with words and phrases using the term "availability".

First Embodiment

An example of the overall structure of a lateral-motion control system for vehicles, to which a lateral-motion control apparatus according to a first embodiment of the present disclosure is applied, is disclosed as a block diagram in FIG. 1. The lateral-motion control system according to this embodiment is designed to control lateral motions of a vehicle by controlling a plurality of controlled objects, specifically, front-wheel steering, rear-wheel steering, and braking of the controlled vehicle.

Referring to FIG. 1, the lateral-motion control system includes a control requestor 1, a sensor unit 2, a target value generator 3, a vehicle condition monitor 4, a controllable range computer 5, a feedforward (F/F) computer 6, a feedback (F/B) computer 7, a determiner 8, various managers 9 to 11, various electronic control units (ECUs) 12 to 15, various actuators (ACTs) 16 to 19 for controlling lateral motions of the controlled vehicle, and a controllable range converter 20. For example, the target value generator 3, vehicle condition monitor 4, controllable range computer 5, feedforward computer 6, feedback computer 7, and determiner 8, or the elements 3 to 8 and the managers 9 to 11 correspond to the vehicle lateral-motion control apparatus.

Note that each of or some of the blocks 1 to 11 included in the lateral-motion control system can be designed as a hardware circuit, a programmed logic circuit, or a hardware and programmed-logic hybrid circuit.

The control requestor 1 is adapted to output, based on the conditions of the controlled vehicle, request signals associated with lateral motions of the controlled vehicle in accordance with a control request of each of a variety of applications (application programs) that carries out a corresponding routine of the lateral-motion control of the controlled vehicle; these applications are installed in the control requestor 1. In this embodiment, to the control requestor 1, controllable range information is inputted from the controllable range computer 5 described later. Each application is programmed to output a control request (an application request) based on the controllable range information inputted from the controllable range computer 5.

For example, the control requestor 1 is provided with at least one controller (not shown) for performing the variety of applications including a lane-keeping control application and a lane-departure prevention application.

The at least one controller runs the lane-keeping application to: capture an image in front of the controlled vehicle; recognize, based on the captured image, lane markers formed on both sides of a lane of a road through which the controlled vehicle is running; and perform lateral-motion control of the controlled vehicle to keep the controlled vehicle within the lane while the controlled vehicle is running through the lane.

The at least one controller runs the lane-departure prevention application to: capture an image in front of the controlled vehicle; recognize, based on the captured image, lane markers formed on both sides of the running lane; perform lateral-motion control of the controlled vehicle to prevent the controlled vehicle from departing from the recognized lane markers while the controlled vehicle is running through the lane; and generates an alarm signal for the driver to prevent the driver from departing the recognized lane markers.

The applications can include any applications to perform lateral-motion control of a controlled vehicle. For example, the applications can include an emergency avoidance application programmed to perform lateral-motion control of the controlled vehicle to avoid collisions with obstacles located on the lane along the travelling direction of the controlled vehicle. The applications also can include a parking assistance application programmed to perform lateral-motion control of the controlled vehicle to guide the controlled vehicle into a desired parking space via an efficient route.

When determining that starting conditions of corresponding lateral-motion control are met, each application is programmed to output, to the lateral-motion control apparatus, request signals indicative of at least one controlled variable required for the corresponding application (corresponding lateral-motion control), and the description and type of the corresponding application. As a result, at least one of the actuators 16 to 19 required for each application is activated to control corresponding lateral-motion of the controlled vehicle according to the request of a corresponding application. In this embodiment, each application requires, as the at least one controlled variable represented by the corresponding request signals, a request positive/negative lateral acceleration Gy and a request change dGy/dt in the lateral acceleration Gy, The remaining request signal used by each application is represented as an "execution request". The execution request used by each application represents the description and type of a corresponding application, and whether the corresponding application is to be performed.

The control requestor 1 is also adapted to transfer, to the controllable range computer 5, application information indicative of a request mode depending on each application, and the priorities of the respective controlled objects for each application. In this embodiment, the request mode depending on a corresponding application represents what the corresponding application places a higher priority on. For example, as the request mode, safety mode, comfort mode, and ecology (eco) mode can be used. That is, the request mode depending on each application serves as an indicator to select one of the applications based on the descriptions of the applications. For example, if an application whose request mode is the safety mode is selected, lateral-motion control with high responsivity is implemented, and otherwise, if an application whose request mode is the comfort mode is selected, lateral-motion control with low responsivity and without excessive burden on the occupants in the controlled vehicle. If an application whose request mode is the eco mode is selected, lateral-motion control with low energy consumption is implemented. The priorities of the respective controlled objects for each application represent the order of the priorities of the respective controlled objects that should be selected when lateral-motion control corresponding to the application is performed.

The sensor unit 2 is adapted to input, to the vehicle condition monitor 4, information indicative of various conditions of the controlled vehicle. Specifically, the sensor unit 2 is adapted to input, to the vehicle condition monitor 4, measured signals and data signals of results of operations as the information indicative of the various conditions of the controlled vehicle; these measured and data signals represent the various conditions of the controlled vehicle.

In this embodiment, the sensor unit 2 is adapted to transfer, to the vehicle condition monitor 4, information associated with front-wheel steering angle, axle torque, rear-wheel steering angle, and vehicle speed. Specifically, the sensor unit 2 includes, for example, steering angle sensors for outputting measured signals each indicative of a current steering angle of a corresponding front or rear wheel, and is adapted to use the measured signals of the steering angle sensors as the information associated with the front-wheel steering angle and rear-wheel steering angle. The sensor unit 2 includes, for example, a brake ECU installed in the controlled vehicle for calculating currently generated torque of each axle, and is adapted to use the calculated results of the brake ECU as the information associated with the axle torque. The sensor unit 2 includes, for example, a speed sensor for each wheel for outputting a measured signal indicative of the speed of a corresponding wheel, and is adapted to calculate the speed of the controlled vehicle based on the measured signals of the respective speed sensors for the respective wheels, and to use the calculated speed of the controlled vehicle as the information associated with the vehicle speed.

The sensor unit 2 also includes, for example, a yaw rate sensor for outputting a measured signal indicative of the actual yaw rate of the controlled vehicle. The measured signal of the yaw rate sensor or the actual yaw rate calculated based on the measured signal of the yaw rate sensor is transferred from the sensor unit 2 to the feedback computer 7 via the vehicle condition monitor 4. The sensor unit 2 also includes, for example, a section for measuring the friction coefficient ($\mu$) between the tires of the controlled vehicle and the road surface on which the controlled vehicle is running; the friction coefficient will be also referred to as "road-surface $\mu$" hereinafter. For example, because the brake ECU measures the friction coefficient ($\mu$) between the tires of the controlled vehicle and the road surface based on the speed of each wheel, the sensor unit 2 is adapted to transfer, to the vehicle condition monitor 4, the friction coefficient ($\mu$) measured by the brake ECU.

The target value generator 3 is adapted to arbitrate, based on the application request (control request), the requests of the applications using the request positive/negative lateral acceleration Gy and the request change dGy/dt in the lateral acceleration Gy inputted from the control requester 1. For example, the positive acceleration Gy represents lateral acceleration in right-hand turn of the controlled vehicle, and the negative acceleration Gy represents lateral acceleration in left-hand turn of the controlled vehicle.

As a result of the arbitration, the target value generator 3 is adapted to select at least one application that should be performed, and convert the request positive/negative lateral acceleration Gy and the request change dGy/dt in the lateral acceleration Gy into an application request value (a total target value) for at least one control parameter for lateral-motion control of the controlled vehicle; the application request value for the at least one control parameter for lateral-motion control is required to meet the request of the selected at least one application. For example, the at least one control parameter for lateral-motion control includes yaw rate $\gamma$ and the change $d\gamma/dt$ in the yaw rate $\gamma$. Then, the target value generator 3 is adapted to output the application request value (total target value) for the at least one control parameter for lateral-motion control.

For example, as the application request value for the yaw rate $\gamma$, a request absolute quantity of the yaw rate $\gamma$ within a preset control cycle of a corresponding application can be used, and as the application request value for the change $d\gamma/dt$ in the yaw rate $\gamma$, a value of the change $d\gamma/dt$ in the yaw rate $\gamma$ within the preset control cycle of the corresponding application can be used.

The target value generator 3 is adapted to arbitrate the requests of the applications according to the types of the applications.

For example, the target value generator 3 is adapted to add values of the request positive/negative lateral acceleration Gy of all the applications to obtain the sum of the values of the request positive/negative lateral acceleration Gy of all the applications, and add values of the request change dGy/dt in the lateral acceleration Gy of all the applications to obtain the sum of the values of the request change dGy/dt in lateral acceleration of all the applications.

Then, the target value generator 3 is adapted to output an application request value (a total target value) of the yaw rate $\gamma$ corresponding to the sum of the values of the request positive/negative lateral acceleration Gy of all the applications, and output an application request value (a total target value) for the change $d\gamma/dt$ in the yaw rate $\gamma$ corresponding to the sum of the values of the request change dGy/dt in the lateral acceleration Gy of all the applications. Because the application request value for the yaw rate $\gamma$ corresponds to the sum of the values of the request positive/negative lateral acceleration Gy of all the applications and the application request value for the change $d\gamma/dt$ in the yaw rate $\gamma$ corresponds to the sum of the values of the request change dGy/dt in the lateral acceleration Gy of all the applications, it is possible to perform lateral-motion control of the controlled vehicle, which meets the requests of all the applications.

In addition, if the applications are prioritized, the target value generator 3 is adapted to select one application with the highest priority in the applications, and convert the request positive/negative lateral acceleration Gy and the request change dGy/dt in the lateral acceleration Gy into an application request value of the yaw rate $\gamma$ required to meet the request of the selected application and an application request value for the change $d\gamma/dt$ in the yaw rate $\gamma$ required to meet the request of the selected application, respectively. Then, the target value generator 3 is adapted to output the application request value for the yaw rate $\gamma$ and the application request value for the change $d\gamma/dt$ in the yaw rate $\gamma$. Because the application requests of the respective applications represent one of the applications to be performed, the target value generator 3 can easily select, in the applications, one application that is to be performed as the highest application in priority.

Note that, in this embodiment, the request positive/negative lateral acceleration Gy and the request change dGy/dt in the lateral acceleration Gy are used as the controlled variables required for each application, which are inputted from the control requester 1 to the target value generator 3. In this embodiment, the yaw rate $\gamma$ and the change $d\gamma/dt$ in the yaw rate $\gamma$, into which the request positive/negative lateral acceleration Gy and the request change dGy/dt in the lateral acceleration Gy has been converted, are used as control parameters (control variables) for lateral-motion control of the controlled vehicle. This is because the ACTs 16 to 19 can easily manipulate the yaw rate $\gamma$ and the change $d\gamma/dt$ in the yaw rate $\gamma$. This structure can be modified as follows.

Specifically, the yaw rate $\gamma$ and the change $d\gamma/dt$ in the yaw rate $\gamma$ can be used as the controlled variables required for each application, which are inputted from the control requester 1 to the target value generator 3, and used as control parameters (control variables) for lateral-motion control of the controlled vehicle. Similarly, the request positive/negative lateral acceleration Gy and the request change dGy/dt in the lateral acceleration Gy can be used as the controlled variables required for each application, which are inputted from the control requester 1 to the target value generator 3, and used as control parameters (control variables) for lateral-motion control of the controlled vehicle.

In addition, the yaw rate $\gamma$ and the change $d\gamma/dt$ in the yaw rate $\gamma$ can be used as the controlled variables required for each application, which are inputted from the control requester 1 to the target value generator 3. In addition, the positive/negative lateral acceleration Gy and the change dGy/dt in the lateral acceleration Gy, into which the yaw rate $\gamma$ and the change $d\gamma/dt$ in the yaw rate $\gamma$ have been converted, can be used as control parameters (control variables) for lateral-motion control of the controlled vehicle.

The vehicle condition monitor 4 is operative to obtain vehicle information indicative of the current conditions of the controlled vehicle based on the information indicative of the various conditions of the controlled vehicle from the sensor unit 2, and output the vehicle information to the controlled range computer 5 while monitoring them.

Specifically, the vehicle condition monitor 4 is adapted to obtain currently ideal front-wheel steering angles, currently ideal rear-wheel steering angles, currently ideal front-axle torque, currently ideal rear-axle torque, and a currently ideal speed of the controlled vehicle based on the current front-wheel steering angles, the rear-wheel steering angles, the current front-axle torque, the current rear-axle torque, and the current speed of the controlled vehicle measured by the sensor unit 2. These currently ideal values, which should be ideally generated by the vehicle under the current conditions of the vehicle, can be obtained in accordance with commonly well-known equations based on the current front-wheel steering angles, the rear-wheel steering angles, the current front-axle torque, the current rear-axle torque, and the current speed of the controlled vehicle. In addition, the vehicle condition monitor 4 is also operative to obtain, from the sensor unit 2, the road-surface $\mu$, which represents the running conditions of the road surface, as an item of the vehicle information.

The controllable range computer 5 is designed as, for example, a controllable range obtainer. Specifically, the controllable range computer 5 is adapted to receive controllable range of each of the ACTs 16 to 19 from a corresponding one of the ECUs 12 to 15 via the controllable range converter 20, and obtain, based on the received controllable range of each of the ACTs 16 to 19, first information associated with controllable range of each of the controlled objects (the front-wheel steering, the rear-wheel steering, and the braking).

The controllable range computer 5 is also adapted to compute controllable range of overall (total) lateral-motion control of the controlled vehicle based on the first information of each of the controlled objects, the vehicle information supplied from the vehicle condition monitor 4, and the application information supplied from the control requester 1. The controllable range computer 5 is further adapted to output information (controllable range information) of the controllable range of the overall lateral-motion control of the controlled vehicle to the feedforward computer 6 and the feedback computer 7.

Note that the controllable range (availability) of an element means a conceptual term indicative of the controllable range of at least one controlled variable that can be outputted from the structural element. For example, the controllable range (availability) of an element includes the upper limit and/or lower limit of at least one controlled variable that can be outputted from the element, and the upper limit and/or lower limit of the change in the at least one controlled variable; the change in the at least one controlled variable represents responsivity upon the at least one controlled variable is being controlled.

For example, in lateral-motion control of a controlled vehicle, the controllable range of an element includes controllable range of the element in the direction of turning left and controllable range of the element in the direction of turning right. In this embodiment, because the turning direction of the controlled vehicle can be grasped by the direction (sign) of the request lateral acceleration Gy, as the controllable range of an element, any one of the controllable range of the element in right-hand turn of the controlled vehicle and the controllable range of the element in left-hand turn of the controlled vehicle is used in each application. In the emergency avoidance application, as the controllable range of an element, both the controllable range of the element in right-hand turn of the controlled vehicle and the controllable range of the element in left-hand turn of the controlled vehicle can be used because, in the event of emergency, the controlled vehicle can turn in right-hand direction and in left-hand direction.

For example, the controllable range of each of the ACTs 16 to 19 includes the upper limit of at least one controlled variable used by the ACTs 16 to 19, and the upper limit of the responsivity (the rate) of the at least one controlled variable used by the ACTs 16 to 19. The controllable range of each of the controlled objects (the front-wheel steering, the rear-wheel steering, and the braking) includes the upper limit of at least one controlled variable used for controlling each of the controlled objects, and the upper limit of the responsivity (the rate) of the at least one controlled variable used for controlling each of the controlled objects. The controllable range of each of the controlled objects can be obtained based on the controllable ranges of the ACTs 16 to 19. The controllable ranges of the ACTs 16 to 19 are respectively supplied from the corresponding ECUs 12 to 15 to the controllable range computer 5 via the controllable range converter 20 as maps or the other similar data; these maps represent the conditions of the ACTs 16 to 19.

The total of the controllable ranges of the ACTs 16 and 17, which are designed to control the front-wheel steering, constitutes the controllable range of the front-wheel steering, and the controllable range of the ACT 18 designed to control the rear-wheel steering constitute the controllable range of the rear-wheel steering. Similarly, the controllable range of the ACT 19 designed to control the braking constitutes the controllable range of the braking. For this reason, transfer of the controllable ranges of the ACTs 16 to 19 from the ECUs 12 to 15 to the controllable range computer 5 means transfer of the controllable ranges of the controlled objects to the controllable range computer 5. Thus, FIG. 1 illustrates that the controllable range of the front-wheel steering, the rear-wheel steering, and the braking are inputted to the controllable range computer 5 via the controllable range converter 20. More specifically, the controllable range converter 20 is operative to convert the controllable ranges of the front-wheel steering, the rear-wheel steering, and the braking into the controllable ranges of the front-wheel steering, the rear-wheel steering, and the braking in terms of yaw-rate, and to input them to the controllable range computer 5.

Note that the controllable range of the overall lateral-motion control of the controlled vehicle means the total controllable range of at least one controlled variable that can be outputted from the controllable range computer 5 based on the controllable range of each controlled object, the application information, and the vehicle information. Computation of the controllable range of the overall lateral-motion control of the controlled vehicle by the controllable range computer 5 will be described in detail later.

The feedforward computer 6 is adapted to compute a feedforward request value for at least one of the controlled objects based on the application request value (total target value) for the at least one control parameter supplied from the target value generator 3, the controllable range information supplied from the controllable range computer 5, and the application information. The feedforward request value is required to perform feedforward control of the corresponding at least one of the controlled objects.

Specifically, the feedforward computer 6 includes a controlled object selector 61, a modeled-value computer 62, and a feedforward request computer 63.

The controlled object selector 61 is adapted to select one or more controlled objects in the plurality of controlled objects based on, in addition to the application request value for the at least one control parameter supplied from the target value generator 3, the controllable range information and the application information supplied via the controllable range computer 5.

Specifically, the controlled object selector 61 is adapted to select, in the plurality of controlled objects, one or more controlled objects to be used to perform lateral-motion feedforward control. Selection of one or more controlled objects in the plurality of controlled objects is for example performed when a control request associated with lateral-motion control is outputted, for example, when the lane-keeping application is performed. The specific structure of the controlled object selector 61 and how to select one or more controlled objects will be described in detail later.

The modeled-value computer 62 is adapted to, when at least one controlled object is selected by the controlled object selector 61, compute at least one modeled value for the at least one selected controlled object based on the controllable range information supplied from the controllable range computer 5.

Specifically, when controlled objects are selected in the plurality of controlled objects by the controlled object selector 61, allocation of the application request value (total target value) for the at least one control parameter to the selected controlled objects is determined. For example, if two controlled objects are selected by the controlled object selector 61 in a method described later, the upper limit of the at least one control parameter (a controlled variable and/or the change in the corresponding controlled variable) is generated as a local application request value allocated to the at least one control parameter in the first controlled object selected first. If the upper limit of the at least one control parameter does not completely satisfy the application request value, the shortage is generated as a local application request value allocated to the at least one control parameter in the second controlled object selected next.

Note that a local application request value allocated to the at least one parameter in a selected controlled object is different from a modeled value that can be actually generated in the selected controlled object. For this reason, the modeled-value computer 62 stores therein previously prepared date indicative of the relationship between the variable of application request value for at least one control parameter in each of the controlled objects and the variable of modeled value of the corresponding at least one control parameter in a corresponding one of the controlled objects. Then, the modeled-value computer 62 is adapted to obtain a modeled value of at least one control parameter in at least one selected controlled object corresponding to the local application request value for the at least one control parameter.

The feedforward request computer 63 is adapted to compute a feedforward request value for the at least one control parameter in the at least one selected controlled object based on the difference between the modeled value of the at least one control parameter and the local application request value for the at least one control parameter in the at least one selected controlled object. One of various well-known methods of computing a feedforward request value can be used by the feedforward request computer 63. The feedforward request value for the at least one control parameter in each selected controlled object, computed by the feedforward request computer 63, is outputted from the feedforward request computer 63 to the determiner 8 and the feedback computer 7.

In this embodiment, the at least one control parameter includes the yaw rate $\gamma$ (the absolute quantity of the yaw rate $\gamma$). A feedforward request value for the yaw rate $\gamma$ in the front-wheel steering as the selected controlled object will be represented as a first F/F request value for the front-wheel steering, a feedforward request value for the yaw rate $\gamma$ in the rear-wheel steering as the selected controlled object will be represented as a second F/F request value for the rear-wheel steering, and a feedforward request value for the yaw rate $\gamma$ in the breaking as the selected controlled object will be represented as a third F/F request value for the braking.

The feedback computer 7 is adapted to compute a feedback request value for at least one of the controlled objects based on: the modeled value of the at least one control parameter supplied from the feedforward computer 6; the controllable range information supplied from the controllable range computer 5; the application information; and the actual yaw rate supplied from the vehicle condition monitor 4. The feedback request value is required to perform feedback control of the corresponding at least one of the controlled objects.

Specifically, the feedback computer 7 includes a first feedback request computer 71, a controlled object selector 72, and a second feedback request computer 72.

The first feedback request computer 71 is adapted to compute a total feedback request value for the at least one control parameter based on the difference between the sum of the modeled values of the at least one control parameter (yaw rate) of the selected controlled objects obtained from the modeled-value computer 62 and the actual yaw rate measured by the sensor unit 2.

The controlled object selector 72 is adapted to select one or more controlled objects in the plurality of controlled objects based on the controllable range information and the application information supplied via the controllable range computer 5, and the F/F request values supplied from the feedforward computer 6.

Specifically, the controlled object selector 72 is adapted to select, in the plurality of controlled objects, one or more controlled objects to be used to perform lateral-motion feedback control. The functions of the controlled object selector 72 are substantially identical to those of the controlled object selector 61. One or more controlled objects selected by the controlled object selector 72 can be the same as one or more controlled objects selected by the controlled object selector 61 or different therefrom.

The second feedback request computer 73 is adapted to allocate, when at least one controlled object is selected by the controlled object selector 72, the total feedback request value, to the at least one selected controlled object based on a margin of each of the controlled objects calculated by the controlled object selector 72, thus computing a local feedback request value for the at least one selected controlled object. The local feedback request value for the at least one selected controlled object is outputted from the second feedback request computer 73 to the determiner 8. One of various well-known methods of computing a total feedback request value can be used by the feedback computer 71. The margin of each controlled object means an allowance of the absolute quantity of a controlled variable (yaw rate), which can be outputted from a corresponding controlled object, and an allowance of the change in the controlled variable, which can be outputted from a corresponding controlled object.

In this embodiment, a local feedback request value for the yaw rate $\gamma$ in the front-wheel steering as the selected controlled object will be represented as a first F/B request value for the front-wheel steering, a local feedback request value for the yaw rate $\gamma$ in the rear-wheel steering as the selected controlled object will be represented as a second F/B request value for the rear-wheel steering, and a local feedback request value for the yaw rate $\gamma$ in the breaking as the selected controlled object will be represented as a third F/B request value for the braking.

The determiner 8 is adapted to compute a final request value for the at least one control parameter, that is, a final request value for the yaw rate based on the feedforward request value for at least one selected controlled object supplied from the feedforward computer 6 and the local feedback request value for the at least one selected controlled object supplied from the feedback computer 7.

In addition, the determiner 8 is adapted to determine at least one of the three controlled objects (the front-wheel steering, the rear-wheel steering, and the braking) to which control authority is given. Thus, at least one controlled object, to which control authority is given, is determined in the three controlled objects (the front-wheel steering, the rear-wheel steering, and the braking). For example, the determiner 8 is adapted to determine at least one of the three controlled objects to which control authority is given using a criterion of whether at least one of the feedforward request value and the local feedback request value is generated for each of the three controlled objects. The determiner 8 is also adapted to output, to a corresponding manager, the final request value for the yaw rate for the at least one controlled object to which control authority is given. The determiner 8 is also adapted to output, to a corresponding manager, an executive instruction of control of the at least one controlled object to which control authority is given. Hereinafter, a controlled object to which control authority is given will be referred to as an authorized controlled object.

The executive instruction is a command to instruct execution of lateral-motion control of a corresponding authorized controlled object. For example, if control authority is given to the front-wheel steering, a first executive instruction for the front-wheel steering is outputted from the determiner 8 as the executive instruction. If control authority is given to the rear-wheel steering, a second executive instruction for the rear-wheel steering is outputted from the determiner 8 as the executive instruction, if control authority is given to the braking, a third executive instruction for the braking is outputted from the determiner 8 as the executive instruction.

The final request value for the yaw rate for at least one authorized controlled object represents a value of the yaw rate γ required to be generated in control of the at least one authorized controlled object. For example, the final request value for the yaw rate for at least one authorized controlled object can be obtained by calculating the sum of the feedforward request value for the yaw rate γ and the local feedback request value for the yaw rate γ for the at least one authorized controlled object.

Specifically, the sum of the first F/F request value and the first F/B request value obtains the first final request value for the yaw rate for the front-wheel steering, and the sum of the second F/F request value and the second F/B request value obtains the second final request value for the yaw rate for the rear-wheel steering. Moreover, the sum of the third F/F request value and the third F/B request value obtains the third final request value for the yaw rate for the braking. The final request value for the yaw rate for at least one authorized controlled object is transferred to a corresponding manager.

Each of the managers 9 to 11 is adapted to, when the executive instruction and the final request value for the yaw rate for a corresponding controlled object are inputted, convert the final request value for the yaw rate into a commanded physical value of a predetermined control variable, and supply the commanded physical value of the predetermined control variable to a corresponding one of the ECUs 12 to 14.

Specifically, when the executive instruction and the first final request value for the yaw rate are inputted, the front-wheel steering manager 9 converts the first final request value for the yaw rate into commanded values of the steering angles of the front wheels, and supply the commanded values of the steering angles of the front wheels to the respective ECUs 12 and 13.

When the executive instruction and the second final request value for the yaw rate are inputted, the rear-wheel steering manager 10 converts the second final request value for the yaw rate into commanded values of the steering angles of the rear wheels, and supply the commanded values of the steering angles of the rear wheels to the ECU 14.

When the executive instruction and the third final request value for the yaw rate are inputted, the braking manager 11 converts the third final request value for the yaw rate into a commanded value of the additional torque for each wheel, and supply the commanded value of the additional torque for each wheel to the ECU 15.

In this embodiment, as the ACTs 16 to 19, an electronically controlled power-assisted steering ACT (EPS ACT), that is, a motor, 16, a variable gear ratio steering ACT (VGRS ACT) 17, an active rear steering ACT (ARS ACT) 18, and an electronic stability control ACT (ESC ACT) 19 are used. The EPS ACT 16 is operative to control the steering angles of the front wheels, and the VGRS ACT 17 is also operative to control the steering angles of the front wheels. The ARS ACT 18 is operative to control the steering angles of the rear wheels, and the ESC ACT 19 is operative to brake the individual wheels to keep the controlled vehicle under control.

As described above, the steering angles of the front wheels are controlled by at least one of the EPS ACT 16 and the VGRS ACT 17. That is, a common controlled object is controlled by corresponding different ACTs. Thus, a manager for managing the different ACTs is adapted to arbitrate which of the different ACTs is activated, and/or how to allocate the corresponding final request value for the yaw rate to the different ACTs.

For example, the manager 9 corresponding to the EPS ACT 16 and the VGRS ACT 17 for controlling the steering angles of the front wheels is adapted to arbitrate which of the EPS ACT 16 and the VGRS ACT 17 is activated, and/or how to allocate the first final request value for the yaw rate to the EPS ACT 16 and the VGRS ACT 17. Thereafter, the manager 9 is adapted to supply, based on a result of the arbitration, at least part of the first final request value for the yaw rate to each of the ECUs 12 and 13 corresponding to the EPS ACT 16 and the VGRS ACT 17.

Each of the ECUs 12 to 15 is adapted to output an instruction to a corresponding ACT to instruct the corresponding ACT to implement a corresponding final request value for the yaw rate. Specifically, at least one of the ECUs 12 and 13 is adapted to control at least one of the EPS ACT 16 and the VGRS ACT 17, thus implementing the commanded values of the steering angles of the front wheels. The ECU 14 is adapted to control the ARS ACT 18, thus implementing the commanded values of the steering angles of the rear wheels. The ECU 15 is adapted to control the ESC ACT 19, thus implementing the commanded additional torque for each wheel.

Each of the ECUs 12 to 15 is adapted to grasp the controllable range of each of the ACTs 16 to 19 based on the operating conditions of the ACTs 16 to 19, and to transfer the controllable range of each of the ACTs 16 to 19 to the controllable range computer 5. As described above, the controllable range of the ACTs 16 to 19 includes the controllable range of the front-wheel steering, the controllable range of the rear-wheel steering, and the controllable range of the braking.

The controllable range of the front-wheel steering represents the controllable range of the steering angles of the front wheels to be controlled by the EPS ACT 16 and the VGRS ACT 17. The controllable range of the rear-wheel steering represents the controllable range of the steering angles of the rear wheels to be controlled by the ARS ACT 18. The controllable range of the braking represents the controllable range of the additional torque for each wheel to be controlled by the ESC ACT 19.

Specifically, the controllable range of the front-wheel steering includes the controllable range of the absolute quantity of the steering angle of each front wheel and the controllable range of the angular velocity of the steering angle of each front wheel; the angular velocity of the steering angle of each front wheel represents the change in the steering angle of a corresponding front wheel, and demonstrates the responsivity of the steering angle of a corresponding front wheel.

Similarly, the controllable range of the rear-wheel steering includes the controllable range of the absolute quantity of the steering angle of each rear wheel and the controllable range of the angular velocity of the steering angle of each rear wheel; the angular velocity of the steering angle of each rear wheel represents the change in the steering angle of a corresponding rear wheel, and demonstrates the responsivity of the steering angle of a corresponding rear wheel.

In addition, the controllable range of the braking includes the controllable range of the absolute quantity of the torque of each of the front axle and rear axle and the controllable range of the change in the torque of each of the front axle and rear axle. The change in the torque of each of the front axle and rear axle demonstrates the responsivity of the braking of a corresponding one of the front axle and rear axle.

As described above, the lateral-motion control apparatus set forth above is configured to compute the controllable ranges of the ACTs 16 to 19, and the controllable range of the overall lateral-motion control of the controlled vehicle when the request signals are inputted to the lateral-motion control apparatus. The lateral-motion control apparatus is also configured to control each of the ACTs 16 to 19 based on the controllable ranges of the ACTs 16 to 19 and the controllable range of the overall lateral-motion control of the controlled vehicle.

Next, the configuration of each of the controllable range converter 20, the controllable range computer 5, and the controlled object selector 61 (72) will be described in detail hereinafter.

Figure 2:
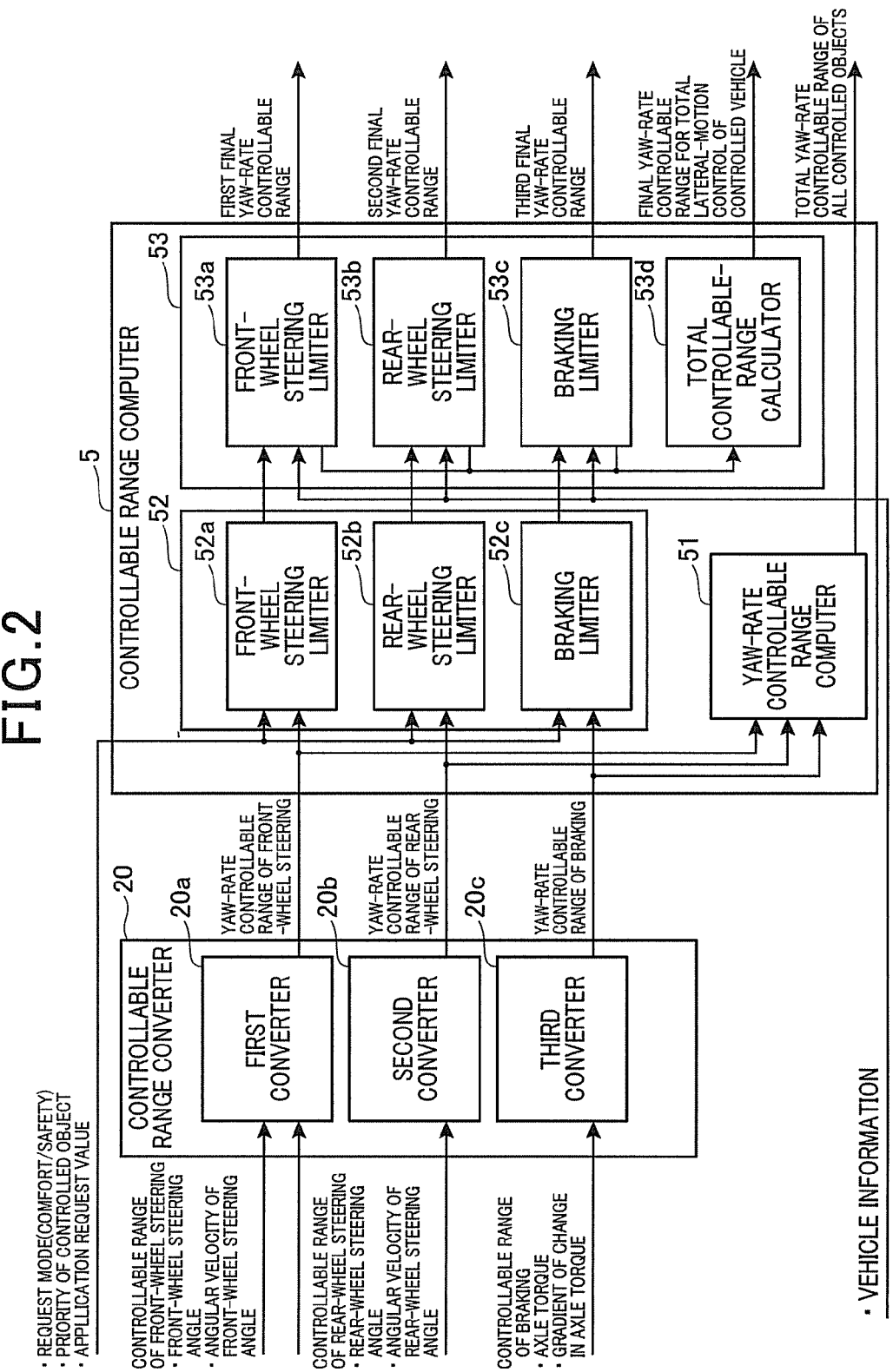
FIG. 2 is a block diagram illustrating the detailed structure of each of a controllable range computer and a controllable range converter illustrated in FIG. 1.

FIG. 2 is a block diagram illustrating the detailed structure of each of the controllable range computer 5 and the controllable range converter 20.

Referring to FIG. 2, the controllable range converter 20 is operative to convert the controllable ranges of the front-wheel steering, the rear-wheel steering, and the braking into controllable ranges of the front-wheel steering, the rear-wheel steering, and the braking in terms of yaw-rate.

The controllable range converter 20 includes a first converter 20a for physical conversion of the controllable range of the front-wheel steering, a second converter 20b for physical conversion of the controllable range of the rear-wheel steering, and a third converter 20c for physical conversion of the controllable range of the braking.

The first converter 20a is adapted to convert the controllable range of the front-wheel steering into a controllable range of the front-wheel steering in terms of yaw-rate, thus calculating a yaw-rate controllable range of the front-wheel steering. The second converter 20b is adapted to convert the controllable range of the rear-wheel steering into a controllable range of the rear-wheel steering in terms of yaw-rate, thus calculating a yaw-rate controllable range of the rear-wheel steering. The third converter 20c is adapted to convert the controllable range of the braking into a controllable range of the braking in terms of yaw-rate, thus calculating a yaw-rate controllable range of the braking.

For example, because the at least one control parameter in the front-wheel steering includes the steering angle of each front wheel and the angular velocity of the steering angle of each front wheel, the first converter 20a converts the steering angle of each front wheel into an absolute quantity of the yaw rate $\gamma$, and converts the angular velocity of the steering angle of each front wheel into the change $d\gamma/dt$ in the yaw rate $\gamma$. The controllable range of each of the yaw rate $\gamma$ and the change $d\gamma/dt$ in the yaw rate $\gamma$ is represented as the yaw-rate controllable range of the front-wheel steering. In other words, the yaw-rate controllable range of the front-wheel steering is a function of the absolute quantity of the yaw rate $\gamma$ and the change $d\gamma/dt$ in the yaw rate $\gamma$.

Similarly, because the at least one control parameter in the rear-wheel steering includes the steering angle of each rear wheel and the angular velocity of the steering angle of each rear wheel, the second converter 20b converts the steering angle of each rear wheel into an absolute quantity of the yaw rate $\gamma$, and converts the angular velocity of the steering angle of each rear wheel into the change $d\gamma/dt$ in the yaw rate $\gamma$. The controllable range of each of the yaw rate $\gamma$ and the change $d\gamma/dt$ in the yaw rate $\gamma$ is represented as the yaw-rate controllable range of the rear-wheel steering. In other words, the yaw-rate controllable range of the rear-wheel steering is a function of the absolute quantity of the yaw rate $\gamma$ and the change $d\gamma/dt$ in the yaw rate $\gamma$.

In addition, because the at least one control parameter in the braking includes the torque of each of the front axle and rear axle and the change in the torque of each of the front axle and rear axle, the third converter 20c converts the torque of each of the front axle and rear axle into an absolute quantity of the yaw rate $\gamma$, and converts the gradient of change in the torque of each of the front axle and rear axle into the change $d\gamma/dt$ in the yaw rate $\gamma$. The controllable range of each of the yaw rate $\gamma$ and the change $d\gamma/dt$ in the yaw rate $\gamma$ is represented as the yaw-rate controllable range of the braking. In other words, the yaw-rate controllable range of the braking is a function of the absolute quantity of the yaw rate $\gamma$ and the change $d\gamma/dt$ in the yaw rate $\gamma$.

The controllable range computer 5 includes a yaw-rate controllable range computer 51, a first limiter 52, and a second limiter 53.

The yaw-rate controllable range computer 51 is adapted to calculate the sum of the yaw-rate controllable range of the front-wheel steering, the yaw-rate controllable range of the rear-wheel steering, and the yaw-rate controllable range of the braking to thereby calculate a total yaw-rate controllable range of all the controlled objects. In other words, the total yaw-rate controllable range of all the controlled objects is a function of the absolute quantity of the yaw rate $\gamma$ and the change $d\gamma/dt$ in the yaw rate $\gamma$.

The first limiter 52 is adapted to perform an application-requested limitation of at least one of the yaw-rate controllable range of the front-wheel steering, the yaw-rate controllable range of the rear-wheel steering, and the yaw-rate controllable range of the braking in accordance with the application request mode included in the application information and/or the priorities of the controlled objects. That is, at least one of the yaw-rate controllable range of the front-wheel steering, the yaw-rate controllable range of the rear-wheel steering, and the yaw-rate controllable range of the braking is limited based on a request from an application. For example, if there is a request from an application not to use braking, the first limiter 52 forcibly sets the yaw-rate controllable range of the braking to zero.

Specifically, the first limiter 52 is comprised of a front-wheel steering limiter 52a, a rear-wheel steering limiter 52b, and a braking limiter 52c. Each of the limiters 52a, 52b, and 52c is adapted to limit a corresponding yaw-rate controllable range in accordance with the application request mode included in the application information and/or the priorities of the controlled objects, thus generating a limited yaw-rate controllable range of a corresponding controlled object.

The second limiter 53 is adapted to perform limitation of at least one of the limited yaw-rate controllable ranges of the respective front-wheel steering, the rear-wheel steering, and the braking in accordance with information associated with the travelling of the controlled vehicle. That is, at least one of the limited yaw-rate controllable ranges of the respective front-wheel steering, the rear-wheel steering, and the braking is further limited based on the vehicle information. For example, if the road surface on which the controlled vehicle is travelling has a low value of the friction coefficient ($\mu$), it is preferable to avoid the use of braking for prevention of slippage. For this reason, if the friction coefficient ($\mu$) of the road surface is lower than a threshold, the second limiter 53 forcibly sets the limited yaw-rate controllable range of the braking to zero.

Specifically, the second limiter 53 is comprised of a front-wheel steering limiter 53a, a rear-wheel steering limiter 53b, a braking limiter 53c, and a total controllable-range calculator 53d.

Each of the first to third limiters 53a to 53c is adapted to perform limitation of a corresponding limited yaw-rate controllable range in accordance with the vehicle information, thus generating a final yaw-rate controllable range of a corresponding controlled object. That is, the first to third limiters 53a to 53c generate a first final yaw-rate controllable range of the front-wheel steering, a second final yaw-rate controllable range of the rear-wheel steering, and a third final yaw-rate controllable range of the braking, respectively. In other words, each of the first final yaw-rate controllable range of the front-wheel steering, second final yaw-rate controllable range of the rear-wheel steering, and third final yaw-rate controllable range of the braking is a function of the absolute quantity of the yaw rate $\gamma$ and the change $d\gamma/dt$ in the yaw rate $\gamma$.

The total controllable-range calculator 53d is adapted to calculate a final yaw-rate controllable range for total lateral-motion control of the controlled vehicle based on the first final yaw-rate controllable range of the front-wheel steering, second final yaw-rate controllable range of the rear-wheel steering, and third final yaw-rate controllable range of the braking. Specifically, the total controllable-range calculator 53d calculates, as the final yaw-rate controllable range for total lateral-motion control of the controlled vehicle, the sum of the first final yaw-rate controllable range of the front-wheel steering, the second final yaw-rate controllable range of the rear-wheel steering, and the third final yaw-rate controllable range of the braking. In other words, the final yaw-rate controllable range for total lateral-motion control of the controlled vehicle is a function of the absolute quantity of the yaw rate $\gamma$ and the change $d\gamma/dt$ in the yaw rate $\gamma$.

As described above, the controllable range computer 5 is configured to correct, based on the application request and/or the vehicle information, the controllable range of each of the controlled objects in terms of yaw-rate; the controllable range of each controlled object also means the limits of a corresponding at least one ACT for a corresponding controlled object, thus calculating the final yaw-rate controllable range of each of the controlled objects.

Then, the controllable range computer 5 is configured to supply the final yaw-rate controllable range of each of the controlled objects to each of the feedforward computer 6 and the feedback computer 7. Note that the application request of at least one application means a request of the at least one application including, in addition to the corresponding application request mode and the corresponding priority represented by the application information, the application request value for at least one control parameter of the at least one application.

In addition, the controllable range computer 5 is also configured to compute the total yaw-rate controllable range of all the controlled objects and the final yaw-rate controllable range for the total lateral-motion control of the controlled vehicle, and supply them to the control requester 1 as the controllable range information. As described above, each application of the control requester 1 is programmed to output a control request based on the controllable range information inputted from the availability computer 5. The detailed descriptions of a control request to be outputted from the control requester 1 will be described later.

Next, the detailed structure of the controlled object selector 61 (72) will be described hereinafter. FIG. 3 is a block diagram illustrating the detailed structure of the controlled object selector 61. Referring to FIG. 3, the controlled object selector 61 is comprised of a controllable range calculator 61a, a comparator 61b, and a selector 61c.

The controllable range calculator 61a is adapted to calculate the absolute quantity of the yaw rate $\gamma$ and the change $d\gamma/dt$ in the yaw rate $\gamma$ based on: the application request values for the control parameters (the yaw rate $\gamma$ and the change in the yaw rate $\gamma$), the application information, and each of the first final yaw-rate controllable range of the front-wheel steering, the second final yaw-rate controllable range of the rear-wheel steering, and the third final yaw-rate controllable range of the braking supplied from the controllable range computer 5.

Specifically, each of the first to third final yaw-rate controllable ranges represents the upper and lower limit of the absolute quantity of a corresponding controlled variable (the yaw rate), and the upper and lower limit of the change $d\gamma/dt$ in the corresponding controlled variable. Thus, the controllable range calculator 61a is adapted to create a map, as an example of data, indicative of the relationship between the controllable range of the absolute quantity of the yaw rate $\gamma$ and the controllable range of the change $d\gamma/dt$ in the yaw rate $\gamma$ for each of the controlled objects (the front-wheel steering, the rear-wheel steering, and the braking). Then, the controllable range calculator 61a is adapted to calculate, based on the map of each of the controlled objects, a value of the absolute quantity of the yaw rate $\gamma$ and a value of the change $d\gamma/dt$ in the yaw rate $\gamma$ according to the application request values and the application information.

Operations of the controllable range calculator 61a set forth above will be fully described hereinafter with reference to FIGS. 4 and 5.

FIG. 4A illustrates an example of a selected result by the controllable range calculator 61a when the application request mode is set to the comfort mode; this selected result represents that an application-request yaw rate as one of the application request values can be implemented by control of each of the controlled objects. FIG. 4B illustrates an example of a selected result by the controllable range calculator 61a when the application request mode is set to the comfort mode; this selected result represents that an application-request yaw rate as one of the application request values can be implemented by control of a part of the controlled objects.

Figure 5A:
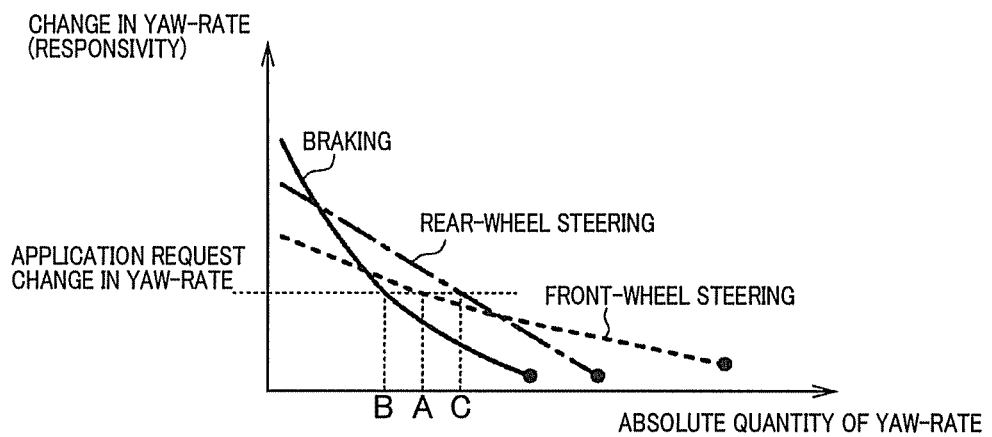
FIG. 5A is a graph schematically illustrating an example of a selected result by the controllable range calculator when the application request mode is set to a safety mode.
Figure 5B:
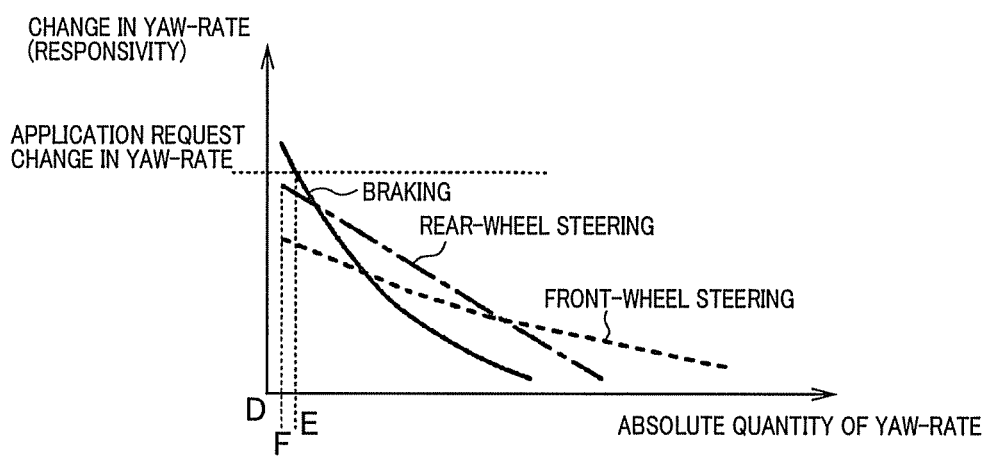
FIG. 5B is a graph schematically illustrating an alternative example of a selected result by the controllable range calculator when the application request mode is set to the safety mode.

FIG. 5A illustrates an example of a selected result by the controllable range calculator 61a when the application request mode is set to the safety mode; this selected result represents that an application-request change in the yaw rate as one of the application request values can be implemented by control of each of the controlled objects. FIG. 5B illustrates an example of a selected result by the controllable range calculator 61a when the application request mode is set to the safety mode; this selected result represents that an application-request change in the yaw rate as one of the application request values can be implemented by control of a part of the controlled objects.

For example, in each of FIGS. 4A and 4B, the map indicative of the relationship between the controllable range of the absolute quantity of the yaw rate $\gamma$ and the controllable range of the change $d\gamma/dt$ in the yaw rate $\gamma$ for each of the controlled objects is illustrated in the form of a graph. Similarly, in each of FIGS. 5A and 5B, the map indicative of the relationship between the controllable range of the absolute quantity of the yaw rate γ and the controllable range of the change dγ/dt in the yaw rate γ for each of the controlled objects is illustrated in the faint of a graph.

If the application request mode is set to the comfort mode, it is preferable to fulfill the application request value with low responsivity and light load on the occupants in the controlled vehicle or with the number of the ACTs to be used being low. For this reason, the controllable range calculator 61a is operative to calculate, in the comfort mode, a value of the absolute quantity of the yaw rate γ and a value of the change dγ/dt in the yaw rate γ relative to the application-request yaw rate.

In contrast, if the application request mode is set to the safety mode, it is preferable to fulfill the application request value with high responsivity because of the matter of emergency. For this reason, the controllable range calculator 61a is operative to calculate, in the safety mode, a value of the absolute quantity of the yaw rate γ and a value of the change dγ/dt in the yaw rate γ relative to the application-request change in the yaw rate γ.

Specifically, referring to FIG. 4A, if the application request mode is set to the comfort mode, and the application-request yaw rate can be implemented by control of each of the controlled objects, in other words, the application-request yaw rate is smaller than the upper limit of the yaw rate γ in the controllable range of each of the controlled objects, a value of the absolute quantity of the yaw rate γ for each of the controlled objects is set to the application-request yaw rate. A value of the change in the yaw rate γ for each of the controlled objects is set to a value at a point at which the graphed map of the controllable range of a corresponding one of the controlled objects intersects with the application-request yaw rate.

For example, in FIG. 4A, a value of the absolute quantity of the yaw rate γ for the front-wheel steering is set to the application-request yaw rate, and a value of the change dγ/dt in the yaw rate γ for the front-wheel steering is set to a value at point A at which the graphed map of the controllable range of the front-wheel steering intersects with the application-request yaw rate. Similarly, a value the absolute quantity of the yaw rate γ for the rear-wheel steering is set to the application-request yaw rate, and a value of the change dγ/dt in the yaw rate γ for the rear-wheel steering is set to a value at point C at which the graphed map of the controllable range of the rear-wheel steering intersects with the application-request yaw rate. In addition, a value of the absolute quantity of the yaw rate γ for the braking is set to the application-request yaw rate, and a value of the change dγ/dt in the yaw rate γ for the braking is set to a value at point B at which the graphed map of the controllable range of the braking intersects with the application-request yaw rate.

On the other hand, referring to FIG. 4B, if the application request mode is set to the comfort mode, and the application-request yaw rate can be implemented by control of a part of the controlled objects, in other words, the application-request yaw rate is larger than the upper limit of the yaw rate γ in the controllable range of a part of the controlled objects, a value of the absolute quantity of the yaw rate γ for each of the controlled objects and a value of the change in the yaw rate γ for each of the controlled objects are set as follows.

Specifically, referring to FIG. 4B, a value of the absolute quantity of the yaw rate γ for the front-wheel steering, the upper limit of the yaw rate γ in the controllable range of which is larger than the application-request yaw rate, is set to the application-request yaw rate. A value of the change in the yaw rate γ for the front-wheel steering is set to a value at a point at which the graphed map of the controllable range of the front-wheel steering intersects with the application-request yaw rate.

In contrast, a value of the absolute quantity of the yaw rate γ for each of the rear-wheel steering and the braking, the upper limit of the yaw rate γ in the controllable range of which is smaller than the application-request yaw rate, is set to the upper limit of the yaw rate in the controllable range of a corresponding one of the rear-wheel steering and the braking. A value of the change dγ/dt in the yaw rate γ for the rear-wheel steering is set to a value at a point E corresponding to the upper limit of the yaw rate γ in the controllable range of the rear-wheel steering. Similarly, a value of the change dγ/dt in the yaw rate γ for the braking is set to a value at a point F corresponding to the upper limit of the yaw rate γ in the controllable range of the braking. The value of the change dγ/dt in the yaw rate γ at the point E is equal to the value of the change dγ/dt in the yaw rate γ at the point F.

In addition, referring to FIG. 5A, if the application request mode is set to the safety mode, and the application-request change in the yaw rate γ can be implemented by control of each of the controlled objects, in other words, the application-request change in the yaw rate γ is smaller than the upper limit of the change in the yaw rate γ in the controllable range of each of the controlled objects, a value of the change in the yaw rate γ for each of the controlled objects is set to the application-request change in the yaw rate. A value of the absolute quantity of the yaw rate γ for each of the controlled objects is set to a value at a point at which the graphed map of the controllable range of a corresponding one of the controlled objects intersects with the application-request change in the yaw rate.

For example, in FIG. 5A, a value of the change dγ/dt in the yaw rate γ for the front-wheel steering is set to the application-request change in the yaw rate, and a value the absolute quantity of the yaw rate γ for the front-wheel steering is set to a value at point A at which the graphed map of the controllable range of the front-wheel steering intersects with the application-request change in the yaw rate. Similarly, a value of the change dγ/dt in the yaw rate γ for the rear-wheel steering is set to the application-request change in the yaw rate, and a value the absolute quantity of the yaw rate γ for the rear-wheel steering is set to a value at point C at which the graphed map of the controllable range of the rear-wheel steering intersects with the application-request change in the yaw rate. In addition, a value of the change dγ/dt in the yaw rate γ for the braking is set to the application-request change in the yaw rate, and a value the absolute quantity of the yaw rate γ for the braking is set to a value at point B at which the graphed map of the controllable range of the braking intersects with the application-request change in the yaw rate.

On the other hand, referring to FIG. 5B, if the application request mode is set to the safety mode, and the application-request change in the yaw rate can be implemented by control of a part of the controlled objects, in other words, the application-request change in the yaw rate is larger than the upper limit of the change in the yaw rate γ in the controllable range of a part of the controlled objects, a value of the absolute quantity of the yaw rate γ for each of the controlled objects and a value of the change in the yaw rate γ for each of the controlled objects are set as follows.

Specifically, referring to FIG. 5B, a value of the change dγ/dt in the yaw rate γ for the braking, the upper limit of the change in the yaw rate γ in the controllable range of which is larger than the application-request change in the yaw rate, is set to the application-request change in the yaw rate. A value of the absolute quantity of the yaw rate γ for the braking is set to a value at a point E at which the graphed map of the controllable range of the front-wheel steering intersects with the application-request change in the yaw rate.

In contrast, a value of the change $d\gamma/dt$ in the yaw rate $\gamma$ for each of the front-wheel steering and the rear-wheel steering, the upper limit of the change in the yaw rate $\gamma$ in the controllable range of which is smaller than the application-request change in the yaw rate, is set to the upper limit of the change in the yaw rate $\gamma$ in the controllable range of a corresponding one of the front-wheel steering and the rear-wheel steering. A value of the absolute quantity of the yaw rate $\gamma$ for the front-wheel steering is set to a value at point D corresponding to the upper limit of the change in the yaw rate $\gamma$ in the controllable range of the front-wheel steering. Similarly, a value of the absolute quantity of the yaw rate $\gamma$ for the rear-wheel steering is set to a value at point F corresponding to the upper limit of the change in the yaw rate $\gamma$ in the controllable range of the rear-wheel steering. The value of the absolute quantity of the yaw rate $\gamma$ at the point D is equal to the value of the absolute quantity of the yaw rate $\gamma$ at the point F.

The comparator 61b is adapted to compare the application request values for each of the controlled objects, that is, the application-request yaw rate and the application-request change in the yaw rate for each of the control parameters with the respective value of the absolute quantity of the yaw rate $\gamma$ and a value of the change $d\gamma/dt$ in the yaw rate $\gamma$ for a corresponding one of the controlled objects calculated by the controllable range calculator 61a. Specifically, the comparator 61b compares in magnitude a value of the absolute quantity of the yaw rate $\gamma$ and a value of the change $d\gamma/dt$ in the yaw rate $\gamma$ for each of the controlled objects with the respective application request values for a corresponding one of the control parameters, thus determining whether control of each of the controlled objects can satisfy the respective application request values for a corresponding one of the control parameter.

For example, it is assumed that there is a value of the application-request yaw rate is 5, and values of the absolute quantity of the yaw rate $\gamma$ for the front-wheel steering, the rear-wheel steering, and the braking are respectively calculated as 8, 6, 3. In this assumption, control of each of the front-wheel steering and the rear-wheel steering can satisfy the application-request yaw rate, but control of the braking cannot satisfy the application-request yaw rate. In addition, it is assumed that there is a value of the application-request change in the yaw rate is 3, and values of the change $d\gamma/dt$ in the yaw rate $\gamma$ for the front-wheel steering, the rear-wheel steering, and the braking are respectively calculated as 5, 6, 7. In this assumption, control of any of the front-wheel steering, rear-wheel steering, and braking can satisfy the application-request change in the yaw rate.

That is, the comparator 61b is adapted to:

compare the application-request yaw rate for each of the controlled objects with the value of the absolute quantity of the yaw rate $\gamma$ of a corresponding one of the controlled objects;

output a result of the comparison as a first comparison result;

compare the application-request change in the yaw rate for each of the controlled objects with the value of the change $d\gamma/dt$ in the yaw rate $\gamma$ of a corresponding one of the controlled objects; and output a result of the comparison as a second comparison result.

The selector 61c is adapted to select at least one of the controlled objects as a selected controlled object based on a result of the comparison by the comparator 61b.

In this embodiment, the selector 61c selects one of the controlled objects as a selected controlled object so as to fulfill the application-request values according to the selected application request mode. Specifically, the selector 61c selects, as a first controlled object, one of the controlled objects; the one of the controlled objects has the highest priority to be selected. If control of the first controlled object cannot satisfy the application-request values according to the selected application request mode, the selector 61c selects, as a second controlled object, one of the remaining controlled objects. If control of the second controlled object cannot satisfy the application-request values according to the selected application request mode, the selector 61c selects, as a third controlled object, the last controlled object. The selector 61c changes the order of selection of the controlled objects according to the selected application request mode.

How to determine the order of selection of the controlled objects by the selector 61c will be fully described with reference to FIGS. 6A and 6B. FIG. 6A schematically illustrates one example of the order of selection of the controlled objects if the selected application request mode is the comfort mode, and FIG. 6B schematically illustrates one example of the order of selection of the controlled objects if the selected application request mode is the safety mode.

Referring to FIGS. 6A and 6B, a modeled value is determined for the application-request yaw rate, and selection of one of the controlled objects is performed to satisfy the modeled value.

If the comfort mode is selected as the application request mode, the selector 61c serves as a determiner to determine that occupant comfort is higher in priority than urgency (responsivity) of lateral motion control. This results in that the controlled objects are successively selected in descending order of their values of the absolute quantity of the yaw rate $\gamma$ as the first to third controlled objects because high responsivity is not needed in the comfort mode according to a result of comparison between the values of the absolute quantity of the yaw rate $\gamma$ of the first to third controlled objects (see FIG. 6A). This can select the controlled objects to be used to control lateral motions of the controlled vehicle in descending order of their values of the absolute quantity of the yaw rate $\gamma$, making it possible to perform control of lateral motions of the controlled vehicle with fewer controlled objects. This reduces oscillation quantity of lateral motions of the controlled vehicle due to interference of controlled objects, increasing occupant comfort as compared to the case where there are many unnecessary controlled objects to be used to control lateral motions of the controlled vehicle.

On the other hand, if the safety mode is selected as the application request mode, the selector 61c serves as a determiner to determine that urgency of (responsivity) lateral motion control is higher in priority than occupant comfort. This results in that the controlled objects are successively selected in descending order of their values of the change (gradient) $d\gamma/dt$ in the yaw rate $\gamma$ as the first to third controlled objects because high responsivity is needed in the safety mode according to a result of comparison between the values of the change in the absolute quantity of the yaw rate $\gamma$ of the first to third controlled objects (see FIG. 6B). This makes it possible to perform control of lateral motions of the controlled vehicle with higher responsivity so as to place greater importance on safety of the controlled vehicle than occupant comfort. However, if a value of the change $d\gamma/dt$ in the yaw rate $\gamma$ of a controlled object is high with a low value of the absolute quantity of the yaw rate $\gamma$ of the controlled object, the selector 61c can be adapted to change the order of the controlled object to be selected, thus meeting urgency. For example, if a value of the change $d\gamma/dt$ in the yaw rate $\gamma$ of a controlled object is high whereas a value of the absolute quantity of the yaw rate $\gamma$ of the controlled object is equal to or lower than a preset percentage of the application-request yaw rate, the selector 61c can be adapted to reduce the order of the controlled object to be selected.

Figure 7C:
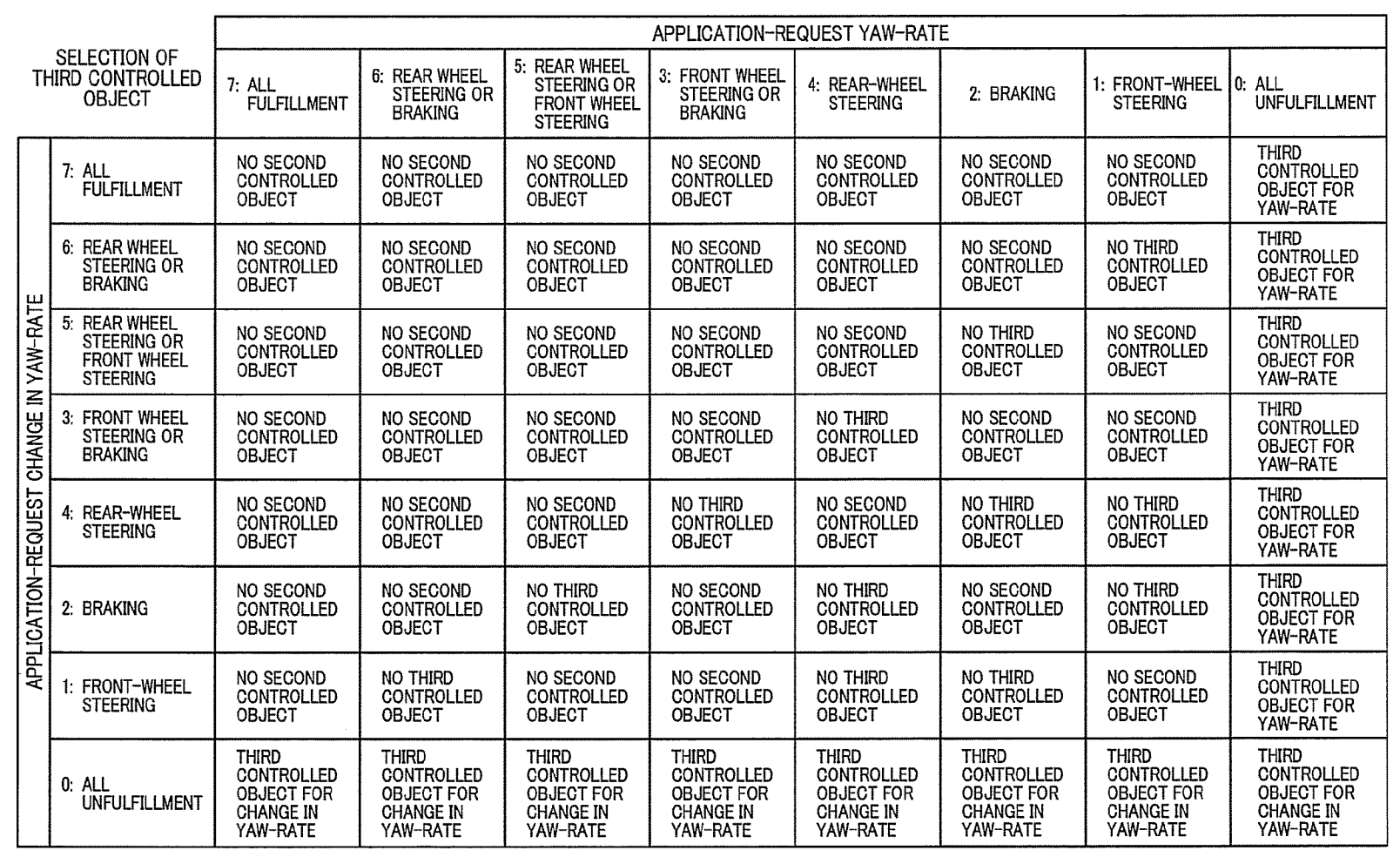
Figure 8B:
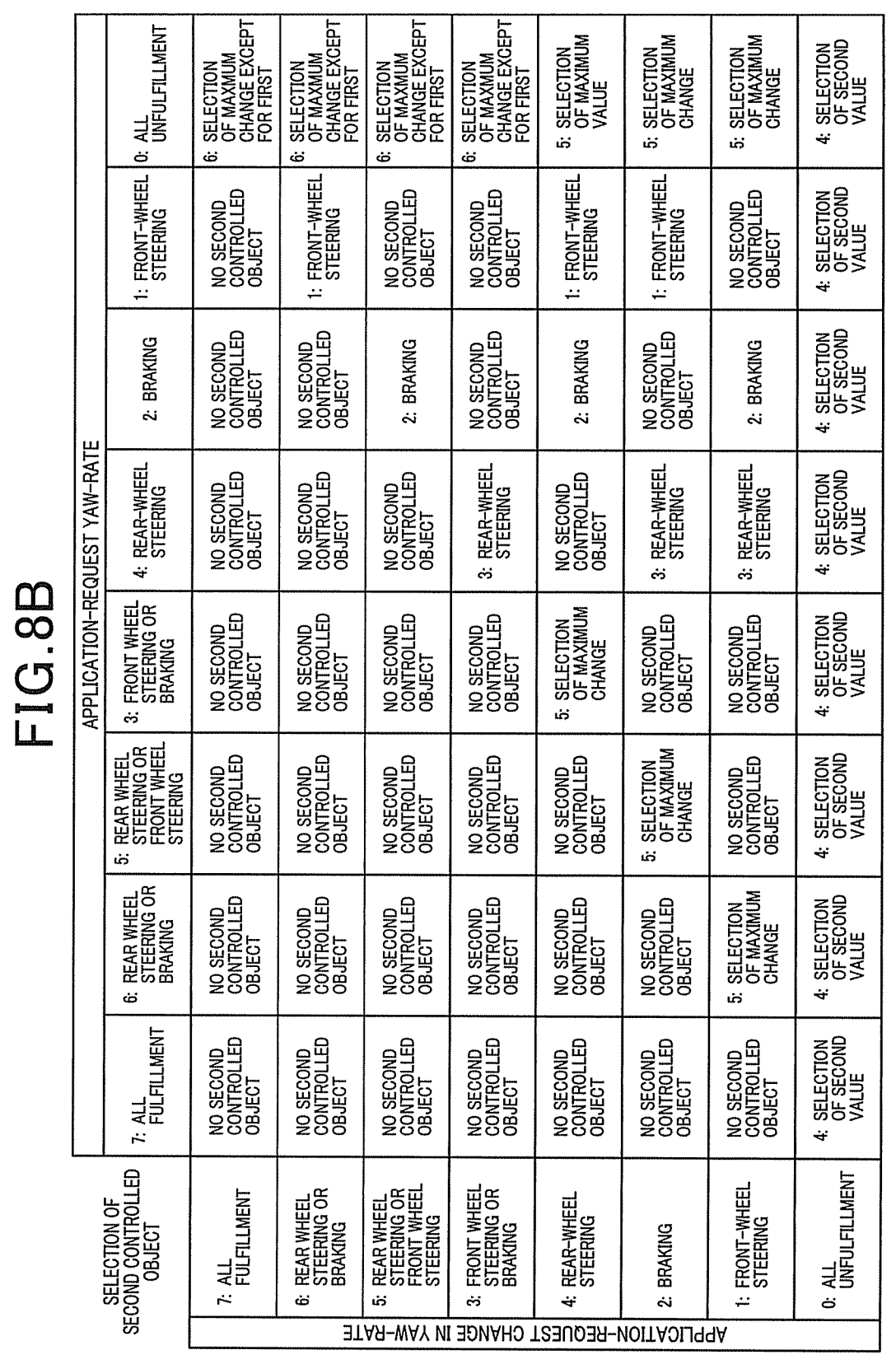

Examples of specific operations of the selector 61c for selection of the first to third controlled objects will be described hereinafter with reference to FIGS. 7A to 7C and 8A to 8C. FIGS. 7A to 7C illustrate maps to be used for selection of the first to third controlled objects in the comport mode as the application request mode, and FIGS. 8A to 8C illustrate maps to be used for selection of the first to third controlled objects in the safety mode as the application request mode. Specifically, each of FIGS. 7A and 8A illustrates a map for selection of the first controlled object having the highest priority in the controlled objects, and each of FIGS. 7B and 8B illustrates a map for selection of the second controlled object having the next higher priority in the controlled objects. Each of FIGS. 7C and 8C illustrates a map for selection of the third controlled object having the third higher priority in the controlled objects. These maps are stored in, for example, the selector 61c. In FIGS. 7A to 7C and 8A to 8C, each of the maps has a table format, but can have any of various data formats.

Each of the maps illustrated in FIGS. 7A to 7C represents a relationship between the variable of comparison results of the application-request yaw rate for each of the controlled objects with the value of the absolute quantity of the yaw rate $\gamma$ of a corresponding one of the controlled objects, the variable of comparison results of the application-request change in the yaw rate for each of the controlled objects with the value of the change in the yaw rate $\gamma$ of a corresponding one of the controlled objects, and the variable of a controlled object to be selected as the first controlled object.

For example, in FIG. 7A, eight columns of the table represent all pieces of information to be outputted as the first comparison result from the comparator 61b.

If the first comparison result represents that control of each of the controlled objects cannot satisfy the application-request yaw rate, the first column "0: ALL UNFULFILLMENT" is selected. If the first comparison result represents that control of the front-wheel steering can only satisfy the application-request yaw rate, the second column "1: FRONT-WHEEL STEERING" is selected. If the first comparison result represents that control of the braking can only satisfy the application-request yaw rate, the third column "2: BRAKING" is selected, or that control of the rear-wheel steering can only satisfy the application-request yaw rate, the fourth column "4: REAR-WHEEL STEERING" is selected.

If the first comparison result represents that control of each of the front-wheel steering and the braking can satisfy the application-request yaw rate, the fifth column "3: FRONT-WHEEL STEERING OR BRAKING" is selected. If the first comparison result represents that control of each of the rear-wheel steering and the front-wheel steering can satisfy the application-request yaw rate, the sixth column "5: REAR-WHEEL STEERING OR FRONT-WHEEL STEERING" is selected, or that control of each of the rear-wheel steering and the braking can satisfy the application-request yaw rate, the seventh column "6: REAR-WHEEL STEERING OR BRAKING" is selected. If the first comparison result represents that control of any of the front-wheel steering, rear-wheel steering, and braking can satisfy the application-request yaw rate, the eighth column "7: ALL FULFILLMENT" is selected.

Similarly, eight rows of the table represent all pieces of information to be outputted as the second comparison result from the comparator 61b.

If the second comparison result represents that control of each of the controlled objects cannot satisfy the application-request change in the yaw rate, the first row "0: ALL UNFULFILLMENT" is selected. If the second comparison result represents that control of the front-wheel steering can only satisfy the application-request change in the yaw rate, the second row "1: FRONT-WHEEL STEERING" is selected. If the second comparison result represents that control of the braking can only satisfy the application-request change in the yaw rate, the third row "2: BRAKING" is selected, or that control of the rear-wheel steering can only satisfy the application-request change in the yaw rate, the fourth row "4: REAR-WHEEL STEERING" is selected.

If the second comparison result represents that control of each of the front-wheel steering and the braking can satisfy the application-request change in the yaw rate, the fifth row "3: FRONT-WHEEL STEERING OR BRAKING" is selected. If the second comparison result represents that control of each of the rear-wheel steering and the front-wheel steering can satisfy the application-request change in the yaw rate, the sixth row "5: REAR-WHEEL STEERING OR FRONT-WHEEL STEERING" is selected, or that control of each of the rear-wheel steering and the braking can satisfy the application-request change in the yaw rate, the seventh row "6: REAR-WHEEL STEERING OR BRAKING" is selected. If the second comparison result represents that control of any of the front-wheel steering, rear-wheel steering, and braking can satisfy the application-request change in the yaw rate, the eighth row "7: "ALL FULFILLMENT" is selected.

Information indicative of any of the controlled objects to be selected as the first controlled object is determined at a field in the map at which each column intersects with a corresponding row. For example, information "SELECTION OF MAXIMUM CHANGE" at a field in the map illustrated in FIG. 7A at which each of the columns intersects with the first row represents selection of one of the front-wheel steering, rear-wheel steering, and braking as the first controlled object, the one of the front-wheel steering, rear-wheel steering, and braking has the maximum value of the change $d\gamma/dt$ in the yaw rate $\gamma$ in all the values of the change $d\gamma/dt$ in the yaw rate $\gamma$ of the front-wheel steering, rear-wheel steering, and braking.

First, specific operations of the selector 61c for selection of the first to third controlled objects if the comfort mode is selected as the application request mode.

In order to simply describe the specific operations of the selector 61c, it is assumed that the first comparison result of the comparator 61b represents that control of each of the front-wheel steering and the rear-wheel steering can satisfy the application-request yaw rate, and the second comparison result represents that control of any of the front-wheel steering, rear-wheel steering, and braking can satisfy the application-request change in the yaw rate.

In order to select the first controlled object, the selector 61c selects the sixth column "5: REAR-WHEEL STEERING OR FRONT-WHEEL STEERING" corresponding to the first comparison result in the eight columns of the map illustrated in FIG. 7A. Next, the selector 61c selects the eighth row "7: ALL FULFILLMENT" corresponding to the second comparison result in the eight rows of the map illustrated in FIG. 7A. Then, the selector 61c selects information at the field in the map illustrated in FIG. 7A at which the selected sixth column intersects with the selected eighth row; this information represents "6: BRAKING OR REAR-WHEEL STEERING WITH HIGHER VALUE". That is, the selector 61c selects, as the first controlled object, one of the braking and the rear-wheel steering; the one of the braking and the rear-wheel steering has the value of the absolute quantity of the yaw rate γ is higher than that of the other thereof.

Next, in order to select the second controlled object, the selector 61c selects the sixth column "5 REAR-WHEEL STEERING OR FRONT-WHEEL STEERING" corresponding to the first comparison result in the eight columns of the map illustrated in FIG. 7B. Next, the selector 61c selects the eighth row "7: ALL FULFILLMENT" corresponding to the second comparison result in the eight rows of the map illustrated in FIG. 7B. Then, the selector 61c selects information at the field in the map illustrated in FIG. 7B at which the selected sixth column intersects with the selected eighth row; this information represents "NO SECOND CONTROLLED OBJECT". That is, the selector 61c selects, as the second controlled object, none of the front-wheel steering, rear-wheel steering, and braking.

Note that, in the map illustrated in FIG. 7B, information "5 SELECTION OF MAXIMUM VALUE" at, for example, the field in the map at which the first column intersects with the second row represents information instructing the selector 61c to select, as the second controlled object, one of the controlled objects having the maximum value of the absolute quantity of the yaw rate γ in all the values of the absolute quantity of the yaw rate γ of the controlled objects. In the map illustrated in FIG. 7B, information "6 SELECTION OF MAXIMUM VALUE EXCEPT FOR FIRST" at, for example, the field in the map at which the first column intersects with the fourth row represents information instructing the selector 61c to select, as the second controlled object, one of the remaining controlled objects having the maximum value of the absolute quantity of the yaw rate γ in all the values of the absolute quantity of the yaw rate γ of the remaining controlled objects.

In the map illustrated in FIG. 7B, information "4 SELECTION OF SECOND CHANGE" at, for example, the field in the map at which the first column intersects with the first row represents information instructing the selector 61c to select, as the second controlled object, one of the controlled objects having the next higher value of the change dγ/dt in the yaw rate γ in all the values of the controlled objects.

Next, in order to select the third controlled object, the selector 61c selects the sixth column "5: REAR-WHEEL STEERING OR FRONT-WHEEL STEERING" corresponding to the first comparison result in the eight columns of the map illustrated in FIG. 7C. Next, the selector 61c selects the eighth row "7: ALL FULFILLMENT" corresponding to the second comparison result in the eight rows of the map illustrated in FIG. 7C. Then, the selector 61c selects information at a field in the map illustrated in FIG. 7C at which the selected sixth column intersects with the selected eighth row; this information represents "NO SECOND CONTROLLED OBJECT". That is, the selector 61c selects, as the third controlled object, none of the front-wheel steering, rear-wheel steering, and braking.

Note that, in the map illustrated in FIG. 7C, information "THIRD CONTROLLED OBJECT FOR YAW RATE" at, for example, the field in the map at which the first column intersects with the second row represents information instructing the selector 61c to select, as the third controlled object, the controlled object with the minimum value of the absolute quantity of the yaw rate γ in the values of the absolute quantity of the yaw rate γ of all the controlled objects in order to assist the absolute quantity of the yaw rate γ. In the map illustrated in FIG. 7C, information "THIRD CONTROLLED OBJECT FOR CHANGE IN YAW RATE" at, for example, the field in the map at which the each column intersects with the first row represents information instructing the selector 61c to select, as the third controlled object, the controlled object with the minimum value of the change dγ/dt in the yaw rate γ in the values of the change dγ/dt in the yaw rate γ of all the controlled objects in order to assist a value of the change dγ/dt in the yaw rate γ.

How to determine the order of the first to third controlled objects using the maps illustrated in FIGS. 7A to 7C if the comfort mode is selected as the application request mode has been described in detail. How to determine the order of the first to third controlled objects using the maps illustrated in FIGS. 8A to 8C if the safety mode is selected as the application request mode is substantially identical to that using the maps illustrated in FIGS. 7A to 7C except that the maps illustrated in FIGS. 7A to 7C to be used are changed to the maps illustrated in FIGS. 8A to 8C. Thus, descriptions of how to determine the order of the first to third controlled objects using the maps illustrated in FIGS. 8A to 8C are omitted.

Note that, information "SELECTION OF MAXIMUM VALUE" at a field in the map illustrated in FIG. 8A at which each of the columns intersects with the first row represents selection of one of the front-wheel steering, rear-wheel steering, and braking as the first controlled object, the one of the front-wheel steering, rear-wheel steering, and braking has the maximum value of the absolute quantity of the yaw rate γ in all the values of the absolute quantity of the yaw rate γ of the front-wheel steering, rear-wheel steering, and braking.

Information "FRONT-WHEEL STEERING (REAR-WHEEL STEERING) OR BRAKING WITH HIGHER CHANGE" at a field in the map illustrated in FIG. 8A represents selection of one of the front-wheel steering (rear-wheel steering) and the braking; the one of the front-wheel steering (rear-wheel steering) and the braking has a value of the change in the yaw rate γ is higher than that of the other thereof. Information "FRONT-WHEEL STEERING OR REAR-WHEEL STEERING WITH HIGHER CHANGE" at a field in the map illustrated in FIG. 8A is similar to the Information "FRONT-WHEEL STEERING (REAR-WHEEL STEERING) OR BRAKING WITH HIGHER CHANGE".

Note that, in the map illustrated in FIG. 8B, information "5 SELECTION OF MAXIMUM CHANGE" at, for example, the field in the map at which the first column intersects with the second row represents information instructing the selector 61c to select, as the second controlled object, one of the controlled objects having the maximum value of the change in the yaw rate γ in all the values of the change in the yaw rate γ of the controlled objects. In the map illustrated in FIG. 8B, information "6 SELECTION OF MAXIMUM CHANGE EXCEPT FOR FIRST" at, for example, the field in the map at which the first column intersects with the fourth row represents information instructing the selector 61c to select, as the second controlled object, one of the remaining controlled objects having the maximum value of the change in the yaw rate γ in all the values of the change in the yaw rate γ of the remaining controlled objects.

In the map illustrated in FIG. 8B, information "4 SELECTION OF SECOND VALUE" at, for example, the field in the map at which the first column intersects with the first row represents information instructing the selector 61c to select, as the second controlled object, one of the controlled objects having the next higher value of the absolute quantity of the yaw rate γ in all the values of the controlled objects.

Note that, in the map illustrated in FIG. 8C, information "THIRD CONTROLLED OBJECT FOR CHANGE IN YAW RATE", at, for example, the field in the map at which the first column intersects with the second row represents information instructing the selector 61c to select, as the third controlled object, the controlled object with the minimum value of the change in the yaw rate γ in the values of the change in the yaw rate γ of all the controlled objects in order to assist a value of the change dγ/dt in the yaw rate γ. In the map illustrated in FIG. 8C, information "THIRD CONTROLLED OBJECT FOR YAW RATE" at, for example, the field in the map at which the each column intersects with the first row represents information instructing the selector 61c to select, as the third controlled object, the controlled object with the minimum value of the absolute quantity of the yaw rate γ in the values of the absolute quantity of the yaw rate γ of all the controlled objects in order to assist a value of the absolute quantity of the yaw rate γ.

The maps illustrated in FIGS. 7A to 7C are basically designed such that the controlled objects are selected successively in descending order of their values of the absolute quantity of the yaw rate γ. That is, the maps illustrated in FIGS. 7A to 7C are basically designed such that a controlled object, which is determined to be optimum to meet the application request values, is only selected without selection of all of the controlled objects.

If a controlled object completely fulfills the application-request yaw rate and the application-request change in the yaw rate, the controlled object is only selected as a selected controlled object. If some controlled objects completely fulfill the application-request yaw rate, one of these controlled objects is selected as a selected controlled object based on the values of the application-request change in the yaw rate of these controlled objects. If each of the controlled objects fulfills the application-request yaw rate, but none of the controlled objects fulfills the application-request change in the yaw rate, a controlled object whose value of the change dγ/dt in the yaw rate γ is the highest in the values of the change dγ/dt in the yaw rate γ of all the controlled objects is selected as a selected controlled object. This can reduce the number of controlled objects to be selected.

In contrast, the maps illustrated in FIGS. 8A to 8C are basically designed such that the controlled objects are selected successively in descending order of their values of the change dγ/dt in the yaw rate γ. That is, the maps illustrated in FIGS. 8A to 8C are basically designed such that a controlled object, which is determined to be optimum to meet the application request values, is only selected without selection of all of the controlled objects.

If a controlled object completely fulfills the application-request yaw rate and the application-request change in the yaw rate, the controlled object is only selected as a selected controlled object. If some controlled objects completely fulfill the application-request change in the yaw rate, one of these controlled objects is selected as a selected controlled object based on the values of the application-request yaw rate of these controlled objects. If each of the controlled objects fulfills the application-request change in the yaw rate, but none of the controlled objects fulfills the application-request yaw rate, a controlled object whose value of the absolute quantity of the yaw rate γ is the highest in the values of the absolute quantity of all the controlled objects is selected as a selected controlled object. This can reduce the number of controlled objects to be selected.

After completion of selection of at least one controlled object by the controlled object selector 61, the modeled-value computer 62 computes at least one modeled value for the at least one selected controlled object based on, for example, the application-request yaw rate, the application-request change in the yaw rate, and the controllable range of the at least one selected controlled object.

The feedforward request computer 63 computes a feedforward request value for the absolute quantity of the yaw rate γ in the at least one selected controlled object based on the difference between the at least one modeled value for the at least one selected controlled object and the application-request yaw rate.

In this embodiment, as described above, at least one of the first F/F request value for the front-wheel steering, the second F/F request value for the rear-wheel steering, and the third F/F request value for the braking is outputted from the F/F computer 6 to the determiner 8.

As well as the controlled object selector 61, the controlled object selector 72 of the feedback computer 7 selects at least one controlled object to be used to perform lateral-motion control of the controlled vehicle. The second feedback request computer 73 computes a local feedback request value for the at least one selected controlled object. The local feedback request value for the at least one selected controlled object is outputted from the second feedback request computer 73 to the determiner 8.

In this embodiment, as described above, at least one of the first F/B request value for the front-wheel steering, the second F/B request value for the rear-wheel steering, and the third F/B request value for the braking is outputted from the F/B computer 7 to the determiner 8.

Based on the at least one of the first F/F request value for the front-wheel steering, the second F/F request value for the rear-wheel steering, and the third F/F request value for the braking and the at least one of the first F/B request value for the front-wheel steering, the second F/B request value for the rear-wheel steering, and the third F/B request value for the braking, a commanded value of at least one controlled object is outputted to a corresponding at least one of the ECUs 12 to 14 via the determiner 8 and a corresponding at least one of the managers 9 to 11. The corresponding at least one of the ECUs 12 to 14 activates a corresponding at least one of the ACTs 16 to 19 based on the commanded value of the corresponding at least one controlled objects, thus implementing lateral-motion control of the controlled vehicle according to the request of at least one application.

The first limiter 52 according to the first embodiment is adapted to perform an application-requested limitation (change) of at least one of the yaw-rate controllable range of the front-wheel steering, the yaw-rate controllable range of the rear-wheel steering, and the yaw-rate controllable range of the braking, thus changing at least one of the yaw-rate controllable range of the front-wheel steering, the yaw-rate controllable range of the rear-wheel steering, and the yaw-rate controllable range of the braking according to a request of an application included in the application request mode.

Specially, the first limiter 52 is adapted to perform the application-requested limitation of at least one of the yaw-rate controllable range of the front-wheel steering, the yaw-rate controllable range of the rear-wheel steering, and the yaw-rate controllable range of the braking every preset control cycle or every input of the application request mode. This changes at least one of the yaw-rate controllable range of the front-wheel steering, the yaw-rate controllable range of the rear-wheel steering, and the yaw-rate controllable range of the braking according to the request of an application.

For example, when a zero-deceleration request is included in the application request mode as the request of an application, the first limiter 52 limits the yaw-rate controllable range of each of the controlled objects so that the upper limit of the yaw-rate controllable range of each of the controlled objects is equal to or lower than a value of the yaw rate corresponding to the upper limit level of deceleration of, for example, 0.1 [m/s²].

The zero-deceleration request aims to set a level of deceleration of the controlled vehicle as low as possible. In the first embodiment, the first limiter 52 stores therein a yaw-rate-deceleration map, as an example of data, indicative of the relationship between each value of the yaw rate γ to be generated by control of each controlled object and a level of deceleration corresponding to the value of the yaw rate γ to be generated by control of a corresponding controlled object. Thus, when the zero-deceleration request is included in the application request mode as the request of an application, the first limiter 52 is adapted to refer to the yaw-rate-deceleration map to extract the upper limit of the yaw rate γ for each controlled object based on a result of the reference.

A level of deceleration to be generated by control of the braking when each value of the yaw rate γ to be generated by control of the braking can be calculated based on a first map, as an example of data, indicative of a function between brake torque and braking force (braking power). A level of deceleration to be generated by control of the front-wheel steering when each value of the yaw rate γ to be generated by control of the front-wheel steering can be calculated based on a second map, as an example of data, indicative of a function between cornering resistance and front-wheel steering angle. A level of deceleration to be generated by control of the rear-wheel steering when each value of the yaw rate γ to be generated by control of the rear-wheel steering can be calculated based on a third map, as an example of data, indicative of a function between cornering resistance and rear-wheel steering angle. Each of the first to third maps can have been determined by tests and/or simulations using the lateral-motion control system. Specifically, the first limiter 52 is adapted to calculate a relationship between a level of deceleration generated by control of each controlled object based on a corresponding one of the first to third map when each value of the yaw rate γ is generated by control of a corresponding controlled object, create a map based on the relationship, and store therein the map as the yaw-rate-deceleration map.

FIG. 9 schematically illustrates an example of the yaw-rate-deceleration map. When a level (0.1 [m/s²]) of deceleration generated by control of the braking is set to the upper limit level of deceleration, the first limiter 52 is adapted to refer to the yaw-rate-deceleration map to thereby obtain a corresponding value of the yaw rate of 0.0025 rad/s (see FIG. 9). Similarly, when a level (0.1 [m/s²]) of deceleration generated by control of the rear-wheel steering is set to the upper limit level of deceleration, the first limiter 52 is adapted to refer to the yaw-rate-deceleration map to thereby obtain a corresponding value of the yaw rate of 0.10 rad/s (see FIG. 9). In addition, when a level (0.1 [m/s²]) of deceleration generated by control of the front-wheel steering is set to the upper limit level of deceleration, the first limiter 52 is adapted to refer to the yaw-rate-deceleration map to thereby obtain a corresponding value of the yaw rate of 0.25 rad/s (see FIG. 9). Thus, the first limiter 52 calculates a value of the yaw rate γ for each controlled object at which a level of the deceleration to be generated by control of a corresponding controlled object is equal to or lower than the upper limit level of deceleration; the calculated value of the yaw rate γ will be referred to as a limit yaw-rate value.

Figure 10A:
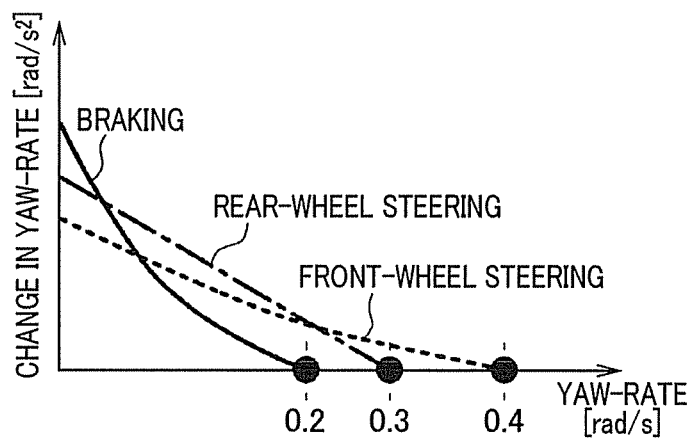
FIG. 10A is a graph schematically illustrating a map between a variable of an absolute quantity of a yaw rate and a variable of the change in the yaw rate based on a limited yaw-rate controllable range of each of the controlled objects when a zero-deceleration request is not included in an application request mode.

Next, the first limiter 52 is adapted to adjust the limited yaw-rate controllable range of each of the controlled objects according to the limit yaw-rate value of a corresponding one of the controlled objects. Specifically, when a map between a variable of the absolute quantity of the yaw rate γ and a variable of the change dγ/dt in the yaw rate γ based on the limited yaw-rate controllable range of each of the controlled objects when the zero-deceleration request is not included in the application request mode is illustrated in FIG. 10A, the first limiter 52 limits the upper limit of the variation in the absolute quantity of the yaw rate γ in the limited yaw-rate controllable range of each of the controlled objects to the limit yaw-rate value of a corresponding one of the controlled objects (see FIG. 10B). For example, the upper limit of the variation in the absolute quantity of the yaw rate γ in the limited yaw-rate controllable range of the braking is limited to the limit yaw-rate value 0.0025 of the braking. Maps illustrated in FIG. 10B correspond to maps based on the yaw-rate controllable range of the respective controlled objects limited in accordance with the application request mode, and the limited yaw-rate controllable ranges of the respective controlled objects are supplied to the second limiter 53.

Figure 10B:
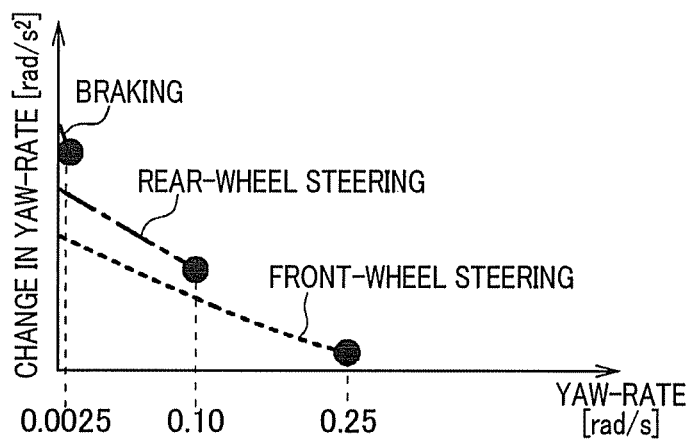
FIG. 10B is a graph schematically illustrating a map between a variable of the absolute quantity of the yaw rate and a variable of the change in the yaw rate based on the limited yaw-rate controllable range of each of the controlled objects when the zero-deceleration request is included in the application request mode.

Thus, after limitation by the second limiter 53 based on the vehicle information, in place of the controllable ranges of the respective controlled objects illustrated as the maps in FIGS. 4 and 5, controllable ranges of the respective controlled objects, which are obtained by limiting the controllable ranges of the respective controlled objects illustrated as the maps in FIG. 10B, are used in each of the feedforward computer 6 and the feedback computer 7 for selection of at least one controlled object.

As described above, the lateral-motion control system according to this embodiment is capable of optimally determining, based on the controllable range of at least one control parameter (a controlled variable and a change therein in this embodiment) for at least one of the controlled objects, at least one of the ACTs 16 to 19 to be activated, and optimally determining a value of the at least control parameter by the activated at least one of the ACTs 16 to 19.

It follows from what has been described that the lateral-motion control system is configured to transfer the final yaw-rate controllable range for the total lateral-motion control of the controlled vehicle to each application stored in the control requester 1. This transfer allows each application to generate, based on the final yaw-rate controllable range for the total lateral-motion control of the controlled vehicle, a control request (an application request) such that the control request does not exceed performance limitations to be achieved by the total lateral-motion control of the controlled vehicle. Thus, it is possible to control lateral motions of the controlled vehicle more suitable for the final yaw-rate controllable range for the total lateral-motion control of the controlled vehicle.

Note that the controllable range computer 5 according to this embodiment is configured to transfer the total yaw-rate controllable range of all the controlled objects to the control requester 1 in addition to the final yaw-rate controllable range for the total lateral-motion control of the controlled vehicle. This configuration allows each application to determine any of the final yaw-rate controllable range for the total lateral-motion control of the controlled vehicle and the total yaw-rate controllable range of all the controlled objects to be used for generation of a control request. Thus, it is possible to control lateral motion of the controlled vehicle to suit any of the final yaw-rate controllable range for the total lateral-motion control of the controlled vehicle and the total yaw-rate controllable range of all the controlled objects.

The lateral-motion control apparatus according to this embodiment is configured to control the plurality of different controlled objects to perform lateral-motion control of the controlled vehicle, thus achieving the application request values for at least one control parameter for each of the controlled objects.

In performing the lateral-motion control of the controlled vehicle, the lateral-motion control apparatus is configured to obtain the controllable range of the at least one control parameter for each of the controlled objects, and determine, based on the controllable range of the at least one control parameter for each of the controlled objects, the priorities of the controlled objects, thus determining a selected controlled object according to the priorities of the controlled objects. For example, the at least one control parameter includes a controlled variable and a change in the controlled variable, and the controllable range of the at least one control parameter includes at least the upper limit of the controlled variable and the upper limit of the change in the controlled variable.

Determination of the priorities of the controlled objects according to the controllable range of the at least one control parameter for each of the controlled objects makes it possible to accurately select a controlled object, which is the highest-priority controlled object in the controlled objects, and pedal in lateral-motion control of the controlled vehicle using the selected controlled object.

The lateral-motion control apparatus according to this embodiment is also configured to determine the priorities of the controlled objects to be used for lateral-motion control of the controlled vehicle according to the application request mode, such as the comfort mode and the safety mode, from at least one selected application. This configuration makes it possible to determine the order of selection of the controlled objects to suit a current condition of the controlled vehicle in which, for example, comfort is more important than responsivity or responsivity is more important than comfort in response to detection of an emergency event.

The lateral-motion control apparatus according to this embodiment is further configured to transfer the controllable range information from the controllable range computer 5 to the control requester 1. This configuration allows each application to generate, based on the controllable range information, a control request such that the control request does not exceed performance limitations to be achieved by lateral-motion control of the controlled vehicle. Thus, it is possible to perform lateral-motion control to suit the controllable range of each of the controlled objects.

In addition, the lateral-motion control apparatus according to this embodiment is configured such that the first limiter 52 performs the application-requested limitation of the yaw-rate controllable ranges of at least one of the controlled objects, thus changing it according to a request of an application. This configuration makes it possible to change the yaw-rate controllable range of at least one of the controlled objects so as to meet the request of an application. This makes it possible to select at least one controlled object that optimally meets the request of an application, thus performing lateral motion control of the controlled vehicle according to the request of an application.

For example, when the zero-deceleration request is included in the application request mode as the request of an application, the first limiter 52 sets the limit yaw-rate value for each controlled object, and changes the yaw-rate controllable range of at least one controlled object such that a level of deceleration generated by the at least one controlled object based on the limit yaw-rate value is equal to or lower than the limit yaw-rate value. This makes it possible to change the yaw-rate controllable range of at least one controlled object so as to meet a request of an application; the request is to limit deceleration of the controlled vehicle. This therefore makes it possible to select at least one controlled object capable of optimally limiting the deceleration of the controlled vehicle.

Note that, in this embodiment, the first limiter 52 determines the upper limit level of deceleration for each controlled object when the zero-deceleration request is included in the application request mode, and calculates the limit yaw-rate value for each controlled object; the limit yaw-rate value for each controlled object allows a level of deceleration generated by control of a corresponding controlled object to be equal to or lower than the upper limit level of deceleration for the corresponding object.

However, the first limiter 52 can reduce or zero the controllable range of at least one specified controlled object when the zero-deceleration request is included in the application request mode as the request of an application. For example, because the braking can generate the maximum level of deceleration, when the zero-deceleration request is included in the application request mode as the request of an application, the first limiter 52 can zero the controllable range of the braking, to perform lateral motion control of the controlled vehicle by control of each of the front-wheel steering and the rear-wheel steering.

Second Embodiment

A lateral-motion control system according to a second embodiment of the present disclosure will be described with reference to FIGS. 11A and 11B. The overall structure and functions of the lateral-motion control system according to the second embodiment are substantially identical to those of the lateral-motion control system according to the first embodiment except for the following points. Therefore, the different points will be mainly described hereinafter.

The second limiter 53 according to this embodiment is adapted to perform limitation (change) of at least one of the limited yaw-rate controllable ranges of the respective front-wheel steering, the rear-wheel steering, and the braking based on the vehicle information. Next, how to change, by the second limiter 53, at least one of the limited yaw-rate controllable ranges of the respective front-wheel steering, the rear-wheel steering, and the braking based on the vehicle information will be described hereinafter. For example, if the vehicle information includes information representing that the friction coefficient ($\mu$) of the road surface on which the controlled vehicle is running is lower than the threshold. The road surface on which the controlled vehicle is running has the friction coefficient ($\mu$) lower than the threshold will be referred to as a low-$\mu$ road surface hereinafter, and the road surface on which the controlled vehicle is running has the friction coefficient ($\mu$) equal to or higher than the threshold will be referred to as a high-$\mu$ road surface hereinafter.

Specially, the second limiter 53 is adapted to perform the change of at least one of the yaw-rate controllable range of the front-wheel steering, the yaw-rate controllable range of the rear-wheel steering, and the yaw-rate controllable range of the braking every preset control cycle or every input of the vehicle information.

For example, when the vehicle information indicative of the low-$\mu$ road surface is inputted to the second limiter 53, the second limiter 53 reduces each of the first final yaw-rate controllable range of the front-wheel steering, the second final yaw-rate controllable range of the rear-wheel steering, and the third final yaw-rate controllable range of the braking in order to meet the reduction in grip of the tires of the controlled vehicle. As how each of the first final yaw-rate controllable range of the front-wheel steering, the second final yaw-rate controllable range of the rear-wheel steering, and the third final yaw-rate controllable range of the braking is reduced, for example, the second limiter 53 stores therein:

a first map, as an example of data, indicative of the relationship between a variable of the friction coefficient (μ) and a variable of the front-wheel steering angle; a second map, as an example of data, indicative of the relationship between a variable of the friction coefficient (μ) and a variable of the rear-wheel steering angle; and a third map, as an example of data, indicative of the relationship between a variable of the friction coefficient (μ) and a variable of braking torque for each wheel, that is, braking torque for each axel. These maps can have been determined by tests and/or simulations using the lateral-motion control system according to this embodiment.

Figure 11A:
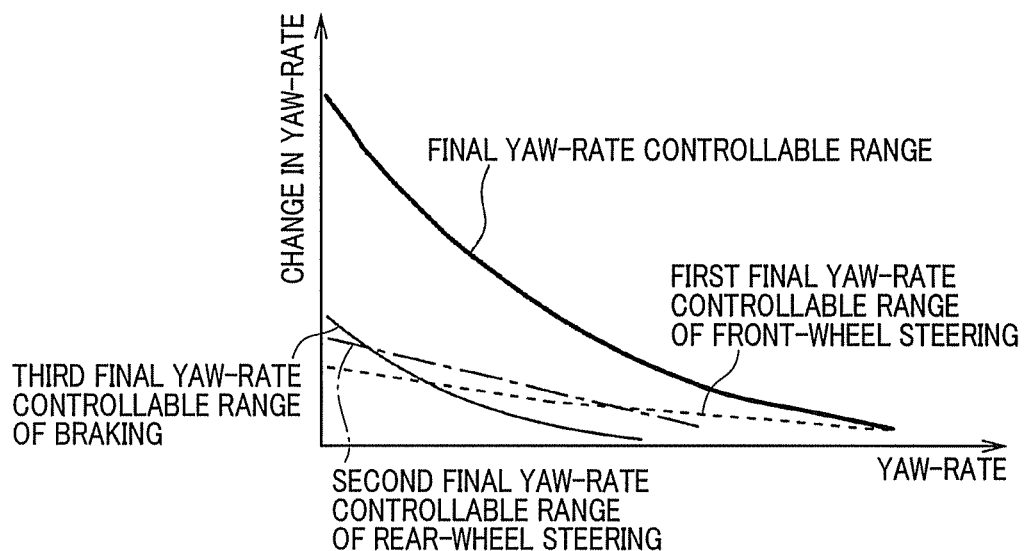
FIG. 11A is a graph schematically illustrating a final yaw-rate controllable range for total lateral-motion control of a controlled vehicle when vehicle information represents a high-µ road surface.

When the vehicle information represents the high-μ road surface, the final yaw-rate controllable range for the total lateral-motion control of the controlled vehicle is represented in FIG. 11A as a map indicative of a function of the absolute quantity of the yaw rate γ and the change dγ/dt in the yaw rate γ. In contrast, when the vehicle information represents the low-μ road surface, the final yaw-rate controllable range for the total lateral-motion control of the controlled vehicle is represented in FIG. 11B as a map indicative of a function of the absolute quantity of the yaw rate γ and the change dγ/dt in the yaw rate γ.

Figure 11B:
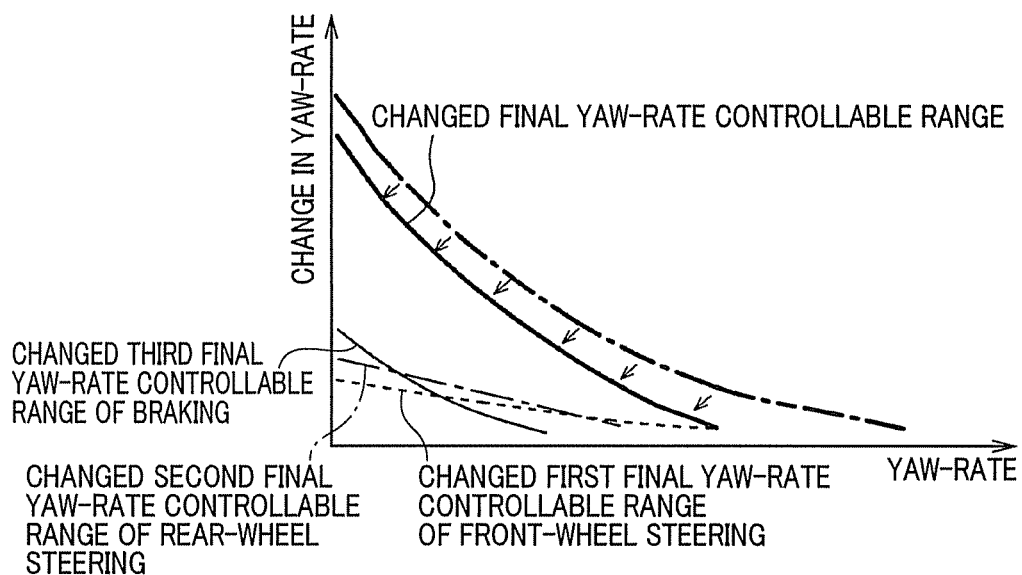
FIG. 11B is a graph schematically illustrating the final yaw-rate controllable range for total lateral-motion control of the controlled vehicle when the vehicle information represents a low-µ road surface.

As clearly seen by comparison between the map illustrated in FIG. 11A and the map illustrated in FIG. 11B, the function of the absolute quantity of the yaw rate γ and the change dγ/dt in the yaw rate γ when the road surface is the low-μ road surface drops overall in comparison to the function of the absolute quantity of the yaw rate γ and the change dγ/dt in the yaw rate γ when the road surface is the high-μ road surface.

That is, when the friction coefficient (μ) of the road surface drops below the threshold, the limited yaw-rate controllable ranges of the respective front-wheel steering, the rear-wheel steering, and the braking, which are supplied from the first limiter 52 to the second limiter 53 are reduced overall to meet the drop of the friction coefficient (μ) of the road surface. As described above, the final yaw-rate controllable range for the total lateral-motion control of the controlled vehicle is represented as the sum of the first final yaw-rate controllable range of the front-wheel steering, the second final yaw-rate controllable range of the rear-wheel steering, and the third final yaw-rate controllable range of the braking.

Thus, the final yaw-rate controllable range for the total lateral-motion control of the controlled vehicle obtained when the road surface is the low-Ξ road surface falls overall in comparison to the final yaw-rate controllable range for the total lateral-motion control of the controlled vehicle obtained when the road surface is the high-μ road surface (see FIGS. 11A and 11B).

As described above, the lateral-motion control apparatus according to this embodiment is configured such that the second limiter 53 performs the limitation (change) of at least one of the limited yaw-rate controllable ranges of the respective front-wheel steering, the rear-wheel steering, and the braking so as to make the at least one of the limited yaw-rate controllable ranges of the respective front-wheel steering, the rear-wheel steering, and the braking meet the vehicle information. This configuration makes it possible to select, in addition to the advantages of the first embodiment, at least one controlled object that optimally meets the current conditions of the controlled vehicle, thus performing lateral motion control of the controlled vehicle according to the current conditions of the controlled vehicle.

For example, when the road surface is the low-μ road surface, the second limiter 53 reduces the first final yaw-rate controllable range of the front-wheel steering, the second final yaw-rate controllable range of the rear-wheel steering, and the third final yaw-rate controllable range of the braking. This makes the first final yaw-rate controllable range of the front-wheel steering, the second final yaw-rate controllable range of the rear-wheel steering, and the third final yaw-rate controllable range of the braking meet the low-μ road surface, thus selecting at least one controlled object that optimally meets the current conditions of the controlled vehicle.

Note that the lateral-motion control apparatus according to this embodiment can be configured such that the second limiter 53 performs the limitation (change) of at least one of the limited yaw-rate controllable ranges of the respective front-wheel steering, the rear-wheel steering, and the braking without the first limiter 52 performing the application-requested limitation of the yaw-rate controllable ranges of at least one of the controlled objects.

Third Embodiment

A lateral-motion control system according to a third embodiment of the present disclosure will be described with reference to FIGS. 12 to 14. The overall structure and functions of the lateral-motion control system according to the third embodiment are substantially identical to those of the lateral-motion control system according to the first embodiment except for the following points. Therefore, the different points will be mainly described hereinafter.

Figure 12:
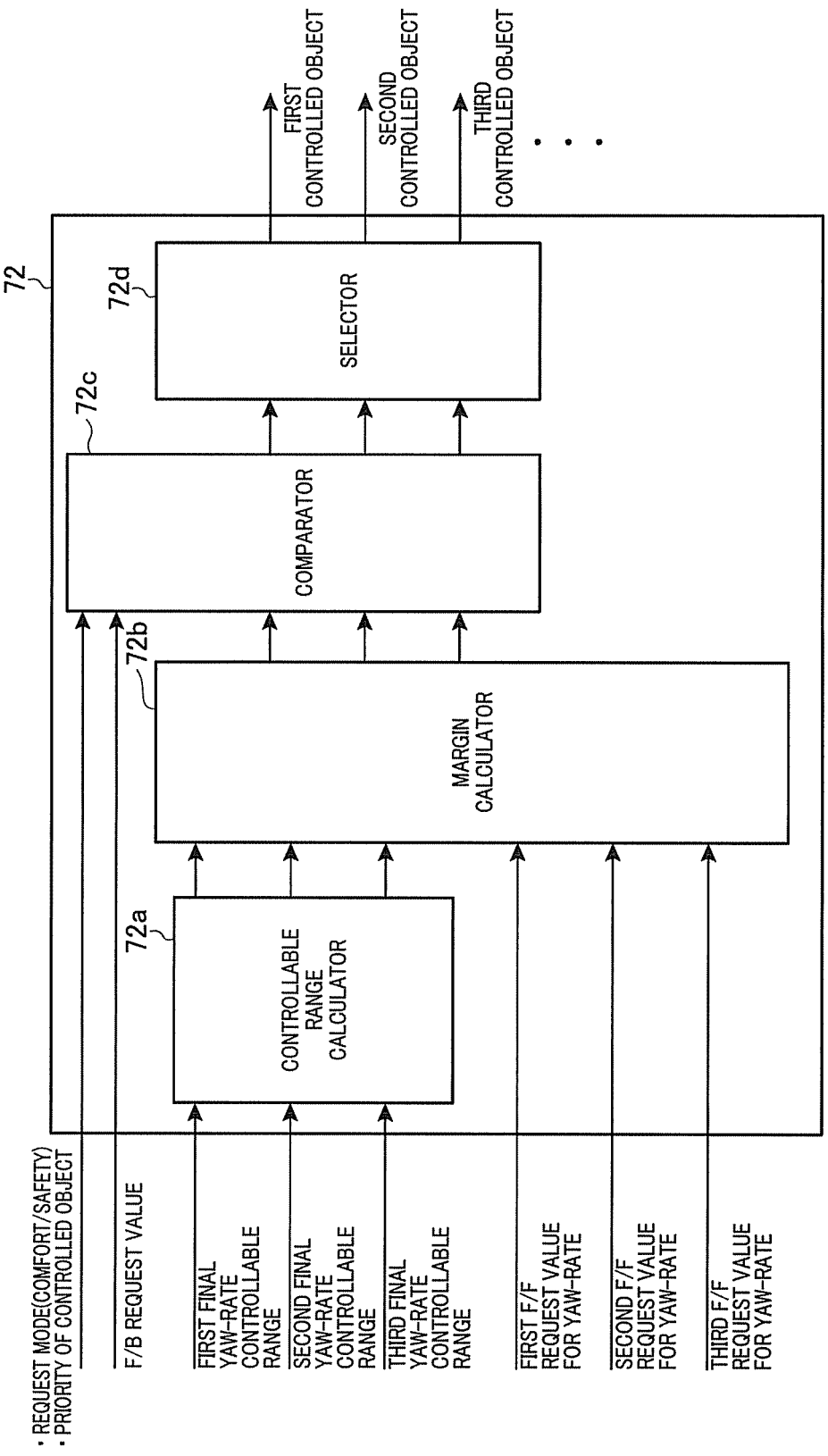
FIG. 12 is a block diagram illustrating the detailed structure of a controlled object selector illustrated in FIG. 1.

Referring to FIG. 12, the controlled object selector 72 is comprised of a controllable range calculator 72a, a margin calculator 72b, a comparator 72c, and a selector 72d.

The controllable range calculator 72a is adapted to calculate the upper limit of the absolute quantity of the yaw rate γ and the upper limit of the change dγ/dt in the yaw rate γ for each of the controlled objects as the controllable range for a corresponding one of the controlled objects based on: the application request values for the control parameters (the yaw rate γ and the change in the yaw rate γ), the application information, and each of the first final yaw-rate controllable range of the front-wheel steering, the second final yaw-rate controllable range of the rear-wheel steering, and the third final yaw-rate controllable range of the braking supplied from the controllable range computer 5. The structure and functions of the controllable range calculator 72a are identical to those of the controllable range calculator 61a set forth above.

The margin calculator 72b is adapted to compare the F/F request value for each of the controlled objects with the controllable range for a corresponding one of the controlled objects calculated by the controllable range calculator 72a, thus calculating a margin of each of the controlled objects based on a result of the comparison. As described above, the margin of each controlled object means an allowance of the absolute quantity of a controlled variable (yaw rate), which can be outputted from a corresponding controlled object, and an allowance of the change in the controlled variable, which can be outputted from a corresponding controlled object. The margin can be calculated for total lateral-motion control of the controlled vehicle in right-hand turn, and for total lateral-motion control of the controlled vehicle in left-hand turn.

For example, if the final yaw-rate controllable range for total lateral-motion control of the controlled vehicle in its right-hand turn is identical to that for total lateral-motion control of the controlled vehicle in its left-hand turn with the F/F request value for each of the controlled objects in right-hand turn being inputted to the controllable range selector 72 (margin calculator 72b), the margin of a corresponding one of the controlled objects in right-hand turn is smaller than controllable range of the corresponding one of the controlled objects in right-hand turn, and the margin of the corresponding one of the controlled objects in left-hand turn is greater than controllable range of the corresponding one of the controlled objects in left-hand turn. How to calculate the margin of each controlled object will be described hereinafter.

First, the margin calculator 72b is configured to calculate the change in the F/F request value for each of the controlled objects based on the F/F request value for a corresponding one of the controlled objects. In this embodiment, because the F/F request value for each of the controlled objects is represented as the F/F request value for the at least one control parameter (the yaw rate) in a corresponding one of the controlled objects, the margin calculator 72b calculates the change in the F/F request value for the at least one control parameter (the yaw rate) for each of the controlled objects based on the F/F request value for the at least one control parameter (yaw rate) for a corresponding one of the controlled objects.

For example, because each application is programmed to perform corresponding lateral motion control every preset control cycle, the F/F request value for each of the controlled objects is inputted to the controllable range selector 72 (margin calculator 72b) every preset control cycle. Thus, the margin calculator 72b is configured to store therein the F/F request value for each of the controlled objects at a current control cycle as the F/F request value for each of the controlled objects at a previous control cycle, and when the F/F request value for each of the controlled objects at a current control cycle next to the previous control cycle is inputted to the margin calculator 72b, the margin calculator 72b is configured to calculate the difference of the F/F request value for each of the controlled objects at the current control cycle from the F/F request value for a corresponding one of the controlled objects at the previous control cycle. Then, the margin calculator 72b is configured to divide the calculated difference by a sampling period, that is, the length of one control cycle, thus calculating the change in the F/F request value for each of the controlled objects.

Next, the margin calculator 72b is configured to calculate the difference between the upper limit of the absolute quantity of the at least one control parameter (yaw rate γ) for each of the controlled objects calculated by the controllable range calculator 72a and the F/F request value for the at least one control parameter (yaw rate) for a corresponding one of the controlled objects, and the difference between the upper limit of the change (dγ/dt) in the at least one control parameter (yaw rate) for each of the controlled objects and the change in the F/F request value for the at least one control parameter (yaw rate) for a corresponding one of the controlled objects.

The difference between the upper limit of the absolute quantity of the at least one control parameter (yaw rate γ) for each of the controlled objects and the F/F request value for the at least one control parameter (yaw rate) for a corresponding one of the controlled objects represents the margin of the at least one control parameter (yaw rate γ) for each of the controlled objects. The difference between the upper limit of the change (dγ/dt) in the at least one control parameter (yaw rate) for each of the controlled objects and the change in the F/F request value for the at least one control parameter (yaw rate) for a corresponding one of the controlled objects represents the margin of the change (dγ/dt) in the yaw rate.

Figure 13A:
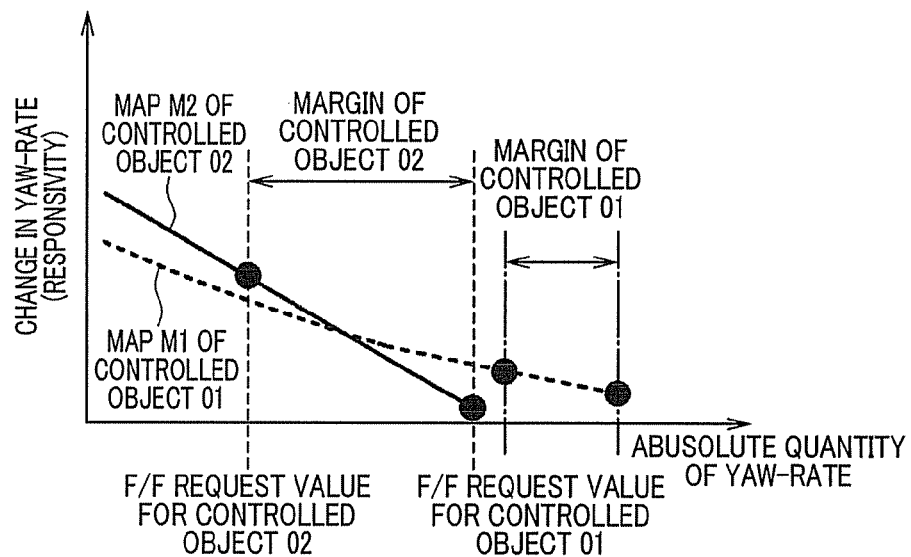
FIGS. 13A and 13B schematically illustrate a concrete image of a margin of the yaw rate for each of a controlled object O1 and a controlled object O2, and a concrete image of the margin of a change in the yaw rate for each of the controlled object O1 and controlled object O2.
Figure 13B:
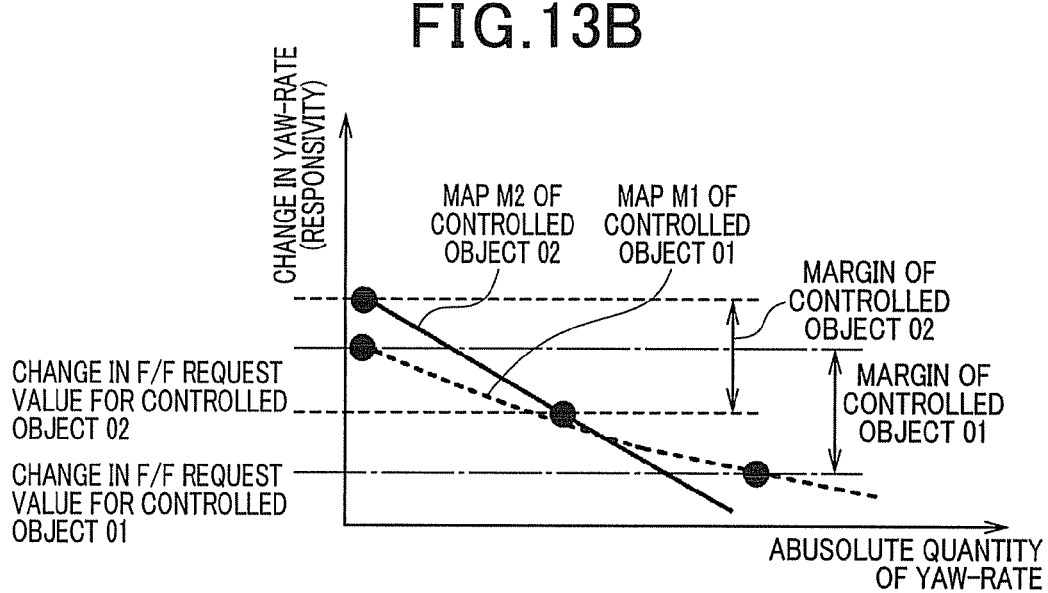

FIGS. 13A and 13B schematically illustrate a concrete image of the margin of the yaw rate γ for each of a controlled object O1 and a controlled object O2 in the three controlled objects, and a concrete image of the margin of the change (dγ/dt) in the yaw rate for each of the controlled object O1 and controlled object O2.

A map M1 between a variable of the absolute quantity of the yaw rate γ and a variable of the change dγ/dt in the yaw rate γ based on the final yaw-rate controllable range of the controlled object O1 and a map M2 between a variable of the absolute quantity of the yaw rate γ and a variable of the change dγ/dt in the yaw rate γ based on the final yaw-rate controllable range of the controlled object O2 are illustrated in FIGS. 13A and 13B.

If the F/F request value for the yaw rate for each of the controlled objects O1 and O2 in left-hand turn of the controlled vehicle are outputted to be inputted to the margin calculator 72b, the difference between the upper limit of the absolute quantity of the yaw rate γ for each of the controlled objects O1 and O2 and the F/F request value for the yaw rate for a corresponding one of the controlled objects O1 and O2 represents the margin of the yaw rate γ for each of the controlled objects O1 and O2. Similarly, the difference between the upper limit of the change dγ/dt in the yaw rate for each of the controlled objects O1 and O2 and the change in the F/F request value for the yaw rate for a corresponding one of the controlled objects O1 and O2 represents the margin of the change dγ/dt in the yaw rate for each of the controlled objects O1 and O2.

For example, the upper limit of the absolute quantity of the yaw rate γ and the upper limit of the change dγ/dt in the yaw rate for the controlled object O1 are respectively set to 0.5 [rad/s] and 1.0 [rad/s$^2$]. In addition, the F/F request value for the yaw rate and the change in the F/F request value for the yaw rate for the controlled object O1 are respectively set to 0.25 [rad/s] and 0.4 [rad/s$^2$]. In this example, the margin of the yaw rate γ and the margin of the change dγ/dt in the yaw rate for the controlled object O1 are respectively obtained as 0.25 [rad/s] and 0.6 [rad/s$^2$].

Similarly, the upper limit of the absolute quantity of the yaw rate γ and the upper limit of the change dγ/dt in the yaw rate for the controlled object O2 are respectively set to 0.4 [rad/s] and 0.8 [rad/s$^2$]. In addition, the F/F request value for the yaw rate and the change in the F/F request value for the yaw rate for the controlled object O2 are respectively set to 0.0 [rad/s] and 0.0 [rad/s$^2$]. In this example, the margin of the yaw rate γ and the margin of the change dγ/dt in the yaw rate for the controlled object O2 are respectively obtained as 0.4 [rad/s] and 0.8 [rad/s$^2$].

The comparator 72c is adapted to compare the total feedback (F/B) request value for the at least one control parameter (yaw rate) with the margin of the corresponding at least one control parameter (the yaw rate γ) for each of the controlled objects. That is, in this embodiment, the comparator 72c is adapted to compare the total F/B request value for the yaw rate with the margin of the yaw rate γ for each of the controlled objects.

If the margin of the yaw rate γ for at least one controlled object is greater than the total F/B request value for the yaw rate as a result of the comparison, the comparator 72c determines that the at least one controlled object is enough to provide the total F/B request value for the yaw rate.

That is, the comparator 72c compares the total F/B request value for the yaw rate with the margin of the yaw rate γ for each of the controlled objects to thereby determine whether each of the controlled objects has a control ability to provide the total F/B request value for the yaw rate. For example, if the margins of the yaw rate γ for the controlled objects O1 and O2 are respectively set to 0.25 [rad/s] and 0.4 [rad/s] set forth above, when the total F/B request value for the yaw rate is 0.1 [rad/s], the margin 0.25 [rad/s] of the yaw rate γ for the controlled object O1 and the margin 0.4 [rad/s] of the yaw rate γ for the controlled object O2 are greater than the total F/B request value for the yaw rate.

Thus, in this case, the comparator 72c determines that each of the controlled objects O1 and O2 is enough to provide the total F/B request value for the yaw rate.

The selector 72d serves as a controlled-object selecting means for determining, based on a result of the calculation by the margin calculator 72b and a result of the comparison by the comparator 72c, priorities of the controlled objects to be used to perform lateral motion control. Specifically, the selector 72d is configured to select at least one controlled object that meets the condition that the margin of the at least one control parameter for the at least one controlled object is greater than the total F/B request value for the at least one control parameter based on a result of the comparison by the comparator 72c. In this embodiment, the selector 72d selects at least one controlled object that meets the condition that the margin of the yaw rate γ for the at least one controlled object is greater than the total F/B request value for the yaw rate based on a result of the comparison by the comparator 72c.

If some controlled objects meet the condition that the margin of the at least one control parameter for each of these controlled objects is greater than the total F/B request value for the at least one control parameter, the selector 72d is adapted to compare a resolution of the at least one control parameter for each of these controlled objects with resolutions of the others, and determine the priorities of these controlled objects in descending order of their resolutions. Note that the resolution of at least one control parameter (yaw rate) represents, for example, an amount of minimum change of the at least one control parameter that can be outputted per unit of time. Thus, the lower the amount of minimum change of the at least one control parameter is, the higher the resolution of the at least one control parameter is.

Figure 14:
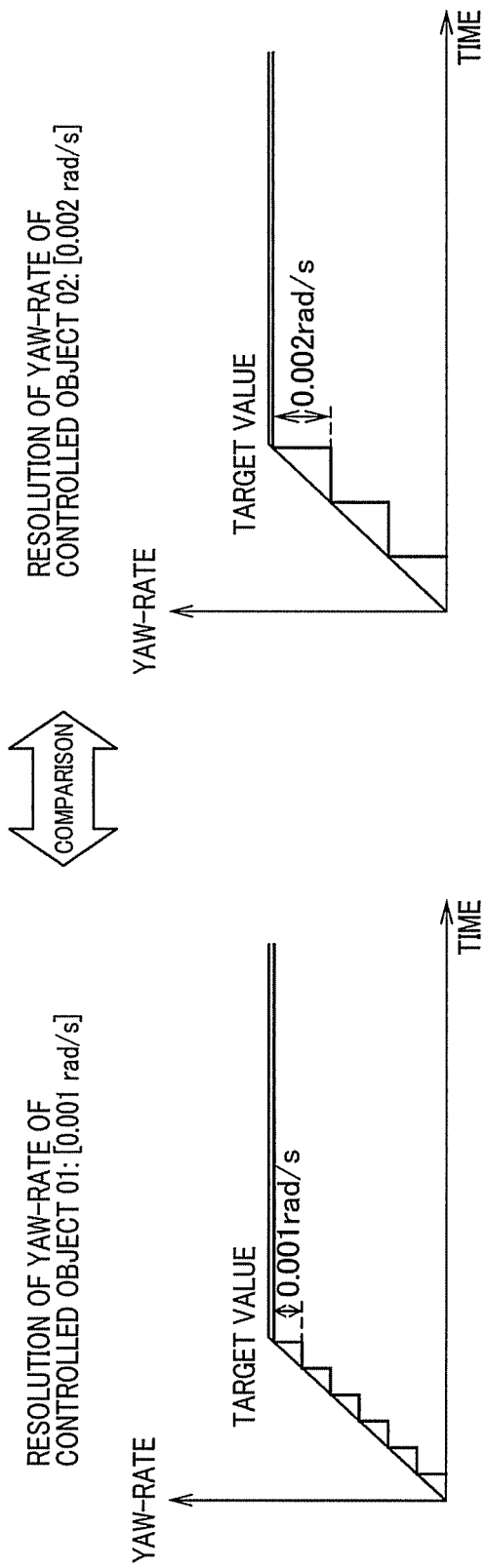
FIG. 14 is a view schematically illustrates an example of comparison between a resolution of the controlled object O1 and that of the controlled object O2.

FIG. 14 schematically illustrates an example of comparison between the resolution of the controlled object O1 and that of the controlled object O2. Referring to FIG. 14, when the resolution of the controlled object O1 is 0.001 [rad/sec], and that of the controlled object O2 is 0.002 [rad/sec], the selector 72d determines the controlled object O1 as the first-priority controlled object, and determines the controlled object O2 as the second-priority controlled object. Determination of a controlled object with a high resolution to be higher in priority than another controlled object with a low resolution makes it possible to finely control lateral motions of the controlled vehicle until a value of the at least one control parameter reaches the total target value thereof.

After completion of the selection of at least one controlled object by the controlled object selector 72, the second feedback request computer 73 is adapted to allocate, when at least one controlled object is selected by the controlled object selector 72, the total F/B request value to the at least one selected controlled object, thus computing a local feedback request value for the at least one selected controlled object, that is, the local feedback request value for the yaw rate γ for the at least one selected controlled object. At that time, when controlled objects are selected by the controlled object selector 72 with priorities being set to the selected controlled objects, the second feedback request computer 73 allocates the total F/B request value to the first-priority controlled object, and, if the first-priority controlled object cannot fulfill the total F/B request value, the second feedback request computer 73 allocates the remainder of the total F/B request value to the second-priority controlled object. That is, as described above, the second feedback request computer 73 is adapted to allocate the total F/B request value to selected controlled objects in the order of priorities of the selected controlled objects until the total F/B request value is completely allocated to at least one of the selected controlled objects.

The configuration of the second feedback request computer 73 according to the third embodiment makes it possible to reduce a number of controlled objects to fulfill the total F/B request value.

As a result, at least one of the first F/B request value (local feedback request value) for the front-wheel steering, the second F/B request value (local feedback request value) for the rear-wheel steering, and the third F/B request value (local feedback request value) for the braking are computed to be outputted from the feedback computer 7 to the determiner 8. Similarly, at least one of the first F/F request value for the front-wheel steering, the second F/F request value for the rear-wheel steering, and the third F/F request value for the braking is outputted from the F/F computer 6 to the determiner 8.

Based on the at least one of the first F/F request value for the front-wheel steering, the second F/F request value for the rear-wheel steering, and the third F/F request value for the braking and the at least one of the first F/B request value for the front-wheel steering, the second F/B request value for the rear-wheel steering, and the third F/B request value for the braking, a commanded value of at least one controlled object is outputted to a corresponding at least one of the ECUs 12 to 14 via the determiner 8 and a corresponding at least one of the managers 9 to 11. The corresponding at least one of the ECUs 12 to 14 activates a corresponding at least one of the ACTs 16 to 19 based on the commanded value of the corresponding at least one controlled objects, thus implementing lateral-motion control of the controlled vehicle according to the request of at least one application.

This configuration of the lateral-motion control system according to this embodiment makes it possible to optimally determine, based on the controllable range of at least one control parameter (a controlled variable and a change therein in this embodiment) for at least one of the controlled objects, at least one of the ACTs 16 to 19 to be activated, and optimally determine a value of the at least control parameter by the activated at least one of the ACTs 16 to 19.

As described above, the feedback computer 7 according to the third embodiment computes the difference between the upper limit of at least one control parameter for each of the controlled objects and the F/F request value for the at least one control parameter to thereby calculate the margin of the at least one control parameter (yaw rate γ) for each of the controlled objects. Then, the feedback computer 7 performs selection of at least one of the controlled objects based on the margins of the respective controlled objects. This configuration achieves, in addition to the advantages achieved by the lateral-motion control system according to the first embodiment, an advantage of allowing selection of a controlled object with the margin greater than the total F/B request value, thus performing lateral motion control via the selected controlled object. In other words, it is possible to select an optimum controlled object in the plurality of controlled objects, and perform lateral motion control via the selected controlled object.

Specifically, the feedback computer 7 is configured such that the controlled objects are successively selected in descending order of their margins greater than the total F/B request value. This configuration can fulfill the total F/B request value by one controlled object with the greatest margin, thus minimizing the number of controlled objects to be driven for lateral motion control. The selection method by the feedback computer 7 reduces oscillation quantity of lateral motions of the controlled vehicle due to interference of controlled objects, increasing occupant comfort as compared to the case where there are many unnecessary controlled objects to be used to control lateral motions of the controlled vehicle.

Fourth Embodiment

A lateral-motion control system according to a fourth embodiment of the present disclosure will be described with reference to FIG. 12. The overall structure and functions of the lateral-motion control system according to the fourth embodiment are substantially identical to those of the lateral-motion control system according to the third embodiment except for the following points. Therefore, the different points will be mainly described hereinafter.

The structure and functions of each of the controllable range calculator 72a and margin calculator 72b according to the fourth embodiment are substantially identical to those of the controllable range calculator 72a and margin calculator 72b according to the third embodiment.

The comparator 72c according to the fourth embodiment is adapted to compare a change in the total feedback (F/B) request value for the at least one control parameter (yaw rate) with the margin of the change in the at least one control parameter for each of the controlled objects. That is, in this embodiment, the comparator 72c is adapted to compare the change in the total F/B request value for the yaw rate with the margin of the change ($d\gamma/dt$) in the yaw rate for each of the controlled objects. The change in the total F/B request value for the yaw rate can be calculated by the difference between the total F/B request value for the yaw rate at a previous control cycle and the total F/B request value for the yaw rate at a current control cycle. That is, the comparator 72c according to this embodiment serves as means for computing the change in the total F/B request value.

If the margin of the change $d\gamma/dt$ in the yaw rate for at least one controlled object is greater than the change in the total F/B request value for the yaw rate as a result of the comparison, the comparator 72c determines that the at least one controlled object is enough to provide the change in the total F/B request value for the yaw rate.

That is, the comparator 72c compares the change in the total F/B request value for the yaw rate with the margin of the change $d\gamma/dt$ in the yaw rate for each of the controlled objects to thereby determine whether each of the controlled objects has a control ability to provide the change in the total F/B request value for the yaw rate. For example, if the margins of the change $d\gamma/dt$ in the yaw rate $\gamma$ for the controlled objects O1 and O2 are respectively set to 0.6 [rad/s] and 0.8 [rad/s] set forth above, when the change in the total F/B request value for the yaw rate is 0.2 [rad/s], the margin 0.6 [rad/s] of the change $d\gamma/dt$ in the yaw rate for the controlled object O1 and the margin 0.8 [rad/s] of the change $d\gamma/dt$ in the yaw rate for the controlled object O2 are greater than the change in the total F/B request value for the yaw rate.

Thus, in this case, the comparator 72c determines that each of the controlled objects O1 and O2 is enough to provide the change in the total F/B request value for the yaw rate.

The selector 72d is adapted to determine, based on a result of the calculation by the margin calculator 72b and a result of the comparison by the comparator 72c, priorities of the controlled objects to be used to perform lateral motion control. Specifically, the selector 72d is configured to select at least one controlled object that meets the condition that the margin of the change in the at least one control parameter for the at least one controlled object is greater than the change in the total F/B request value for the at least one control parameter based on a result of the comparison by the comparator 72c. In this embodiment, the selector 72d selects at least one controlled object that meets the condition that the margin of the change $d\gamma/dt$ in the yaw rate for the at least one controlled object is greater than the change in the total F/B request value for the yaw rate based on a result of the comparison by the comparator 72c.

If some controlled objects meet the condition that the margin of the change $d\gamma/dt$ in the yaw rate for each of these controlled objects is greater than the change in the total F/B request value for the yaw rate, the selector 72d is adapted to compare the margin of the yaw rate $\gamma$ for each of these controlled objects with the margins of the yaw rate $\gamma$ for the others, and determine the priorities of these controlled objects in descending order of their margins.

For example, as described in the third embodiment, if the margins of the yaw rate $\gamma$ for the controlled objects O1 and O2 are respectively set to 0.25 [rad/s] and 0.4 [rad/s] set forth above, the selector 72d determines the controlled object O2 as the first-priority controlled object, and determines the controlled object O1 as the second-priority controlled object. Determination of a controlled object with a high margin of the yaw rate $\gamma$ to be higher in priority than another controlled object with a low margin of the yaw rate $\gamma$ makes it possible to prevent the occurrence of hunting dut to, for example, repeated changes of a controlled object to be used for lateral motion control of the controlled vehicle.

After completion of the selection of at least one controlled object by the controlled object selector 72, the second feedback request computer 73 is adapted to allocate, when at least one controlled object is selected by the controlled object selector 72, the total F/B request value to the at least one selected controlled object, thus computing a local feedback request value for the at least one selected controlled object, that is, the local feedback request value for the yaw rate $\gamma$ for the at least one selected controlled object. At that time, when controlled objects are selected by the controlled object selector 72 with priorities being set to the selected controlled objects, the second feedback request computer 73 allocates the total F/B request value to the first-priority controlled object, and, if the first-priority controlled object cannot fulfill the total F/B request value, the second feedback request computer 73 allocates the remainder of the total F/B request value to the second-priority controlled object. That is, as described above, the second feedback request computer 73 is adapted to allocate the total F/B request value to selected controlled objects in the order of priorities of the selected controlled objects until the total F/B request value is completely allocated to at least one of the selected controlled objects.

The configuration of the second feedback request computer 73 according to the fourth embodiment makes it possible to reduce a number of controlled objects to fulfill the total F/B request value.

As described above, the feedback computer 7 computes the difference between the upper limit of the change in at least one control parameter for each of the controlled objects and the change in the F/F request value for the at least one control parameter to thereby calculate the margin of the change in the at least one control parameter (yaw rate $\gamma$) for each of the controlled objects. Then, the feedback computer 7 performs selection of at least one of the controlled objects based on the margins of the respective controlled objects. This configuration allows selection of a controlled object with the margin greater than the change in the total F/B request value, thus performing lateral motion control via the selected controlled object. In other words, it is possible to select an optimum controlled object in the plurality of controlled objects, and perform lateral motion control via the selected controlled object.

Specifically, the feedback computer 7 is configured such that the controlled objects are successively selected in descending order of their margins greater than the change in the total F/B request value. This configuration can fulfill the change in the total F/B request value by one controlled object with the greatest margin, thus minimizing the number of controlled objects to be driven for lateral motion control. The selection method by the feedback computer 7 can perform lateral-motion control with high responsivity while maintaining occupant comfort. Thus, in addition to the advantages achieved by the lateral-motion control system according to the third embodiment, it is possible to ensure occupant comfort even in the safety mode.

Fifth Embodiment

A lateral-motion control system according to a fifth embodiment of the present disclosure will be described with reference to FIG. 12. The overall structure and functions of the lateral-motion control system according to the fifth embodiment are substantially identical to those of the lateral-motion control system according to the third embodiment except for the following point. Therefore, the different point will be mainly described hereinafter.

In this embodiment, the controlled object selector 72 is adapted to select one or more controlled objects in the plurality of controlled objects based on a result of the selection by the controlled object selector 61 installed in the feedforward computer 6. Specifically, the controlled object selector 72 is adapted to select one or more controlled objects in the plurality of controlled objects; these selected one or more controlled object are the same as one or more controlled objects selected by the controlled object selector 61.

This configuration matches one or more controlled objects selected by the controlled object selector 61 for feedforward control of lateral motions of the controlled vehicle with one or more controlled objects selected by the controlled object selector 72 for feedback control of lateral motions of the controlled vehicle. This reduces a number of controlled objects to be driven for lateral motion control of the controlled vehicle, making it possible to prevent redundant selection of controlled objects.

In each of the first to fifth embodiments, the lateral-motion control apparatus (system) for performing lateral-motion control of the controlled vehicle has been described as an example of dynamic control of the controlled vehicle, but the present disclosure can be applied to a dynamic control apparatus (system) for performing longitudinal-motion control and/or roll-motion control.

Specifically, the present disclosure can be applied to a dynamic control apparatus (system) provided with a plurality of controlled objects and designed to perform motion control of a controlled vehicle in the same direction using the controlled objects. In this application, the lateral-motion control apparatus is capable of obtaining the controllable range of the at least one control parameter for each of the controlled objects, and determine, based on the controllable range of the at least one control parameter for each of the controlled objects, the priorities of the controlled objects, thus determining a selected controlled object according to the priorities of the controlled objects. Determination of the priorities of the controlled objects according to the controllable range of the at least one control parameter for each of the controlled objects makes it possible to accurately select a controlled object, which is the highest-priority controlled object in the controlled objects, and perform lateral-motion control of the controlled vehicle using the selected controlled object.

For example, as the controlled objects for longitudinal-motion control, braking and drive power (engine output and/or motor output) can be used. As the controlled objects for roll-motion control, suspension and/or output of an active stabilizer can be used. In each of the first to third embodiments, the ACTs 13 to 16 are used to control the controlled objects as an example, but another ACT can be used to control a corresponding one of the controlled objects. For example, in each of the first to third embodiments, control of braking is performed by the ESC-ACT 19, but can be performed by a parking brake ACT, or an actuator for controlling an in-wheel motor installed in each wheel by controlling the torque of each of the front axle and rear axle.

In each of the first to fifth embodiments, the lateral-motion control apparatus (system) is configured to determine the degree of urgency for lateral-motion control according to, for example, the application request mode, but the present disclosure is not limited to the configuration. Specifically, the lateral-motion control apparatus (system) can be configured to express the degree of urgency for lateral-motion control as a number as, for example, an application request mode. In addition, the controlled object selector 61 can be configured to determine whether the degree of urgency for lateral-motion control is high based on whether the number of the application request mode is equal to or higher than a threshold. Upon determining that the degree of urgency for lateral-motion control is high, the controlled object selector 61 can be configured to select a controlled with a change in a controlled variable being greater than a change in the corresponding controlled variable of another controlled object. Otherwise, upon determining that the degree of urgency for lateral-motion control is not high, the controlled object selector 61 can be configured to select a controlled with the upper limit of a controlled variable being greater than that of another controlled object.

In the first embodiment, the method of changing the yaw-rate controllable ranges of at least one of the controlled objects when the zero-deceleration request is included in the application request mode has been described. However, the present disclosure is not limited to the method. Specifically, a lateral-motion control apparatus according to a modification can be configured to change the yaw-rate controllable ranges of at least one of the controlled objects when another application's request, such as an acceleration request, a yaw-rate request, and the like, is included in the application request mode. That is, the first limiter 52 according to each of the first to fifth embodiments is configured to limit the yaw-rate controllable ranges of at least one of the controlled objects based on a request of an application, but can serve as a controllable range changing means for changing the yaw-rate controllable ranges of at least one of the controlled objects based on a request of an application.

In the second embodiment, the method of changing at least one of the limited yaw-rate controllable ranges of the respective controlled objects according to the friction μ of the road surface on which the controlled vehicle is running as the vehicle information has been described. However, the present disclosure is not limited to the method.

Specifically, a lateral-motion control apparatus according to a modification can be configured to change at least one of the limited yaw-rate controllable ranges of the respective controlled objects according to information indicative of whether electronic stability control or anti-skid (anti-lock) brake control is running as the vehicle information.

For example, if the vehicle information represents that either electronic stability control or anti-skid (anti-lock) brake control is running, the lateral-motion control apparatus according to the modification can be configured to disable operations of the controlled objects for lateral motion control of the controlled vehicle or change (that is, reduce) at least one of the limited yaw-rate controllable ranges of the respective controlled objects in order to prevent interferences with the running electronic stability control or anti-skid brake control. In addition, the lateral-motion control apparatus according to the modification can be configured to previously store therein the operating range of at least one parameter required for either electronic stability control or anti-skid brake control, such as a variation range of wheel-cylinder pressure, as F/F control information. Then, if the vehicle information represents that either electronic stability control or anti-skid brake control is running, the lateral-motion control apparatus according to the modification can be configured to change at least one of the limited yaw-rate controllable ranges of the respective controlled objects while securing the operating range of the at least one parameter. That is, the second limiter 53 according to each of the first to fifth embodiments is configured to limit at least one of the limited yaw-rate controllable ranges of the respective controlled objects based on the vehicle information, but can serve as a controllable range changing means for changing at least one of the limited yaw-rate controllable ranges of the respective controlled objects based on the vehicle information.

A lateral motion control apparatus according to an alternative modification of each of the third and fourth embodiments of the present disclosure can be configured to select, according to the application request mode and/or degree of urgency, determination of at least one controlled object for F/B lateral motion control based on the margin of the at least one control parameter (yaw rate γ) for each of the controlled objects, or determination of at least one controlled object for F/B lateral motion control based on the margin of the change in the at least one control parameter (yaw rate γ) for each of the controlled objects.

Specifically, if the application request mode is set to the comfort mode or represents low urgency, the lateral motion control apparatus according to the alternative modification can be configured to select determination of at least one controlled object for F/B lateral motion control based on the margin of the at least one control parameter (yaw rate γ) for each of the controlled objects. In contrast, if the application request mode is set to the safety mode or represents high urgency, the lateral motion control apparatus according to the alternative modification can be configured to select determination of at least one controlled object for F/B lateral motion control based on the margin of the change in the at least one control parameter (yaw rate γ) for each of the controlled objects. This alternative modification makes it possible to select at least one controlled object for F/B lateral motion control according to the degree of urgency.

While illustrative embodiments of the present disclosure has been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A vehicle dynamic control apparatus for controlling a plurality of controlled objects according to a request value of a first parameter for each of the plurality of controlled objects from an application associated with motion of a vehicle in a predetermined direction to fulfill the request value of the first parameter, the vehicle dynamic control apparatus comprising:
    a controllable range obtainer configured to obtain a controllable range of a second parameter of each of the plurality of controlled objects, the second parameter being associated with motion of the vehicle in the predetermined direction, the controllable range including at least an upper limit and a lower limit of the second parameter; and
    a selector configured to determine an order of the plurality of controlled objects to be controlled based on the controllable range of the second parameter of each of the plurality of controlled objects, and select at least one of the plurality of controlled objects to be controlled in accordance with the determined order;
    wherein the selector further comprises:
    a comparator configured to compare the request value of the first parameter for each of the plurality of controlled objects with the controllable range of the second parameter of a corresponding one of the plurality of controlled objects; and
    a selecting unit configured to determine the order of the plurality of controlled objects to be controlled based on a result of the comparison by the comparator, and select at least one of the plurality of controlled objects to be controlled in accordance with the determined order.

2. The vehicle dynamic control apparatus according to claim 1, wherein:
    the second parameter includes a controlled variable and a change in the controlled variable of each of the plurality of controlled objects;
    the controllable range obtainer is configured to obtain, as a first controllable range, the controllable range of the controlled variable of each of the plurality of controlled objects, and obtain, as a second controllable range, the controllable range of the change in the controlled variable of each of the plurality of controlled objects; and
    the comparator is configured to compare the request value of the first parameter for each of the plurality of controlled objects with:
    the first controllable range of the controlled variable of a corresponding one of the plurality of controlled objects; and
    the second controllable range of the change in the controlled variable of a corresponding one of the plurality of controlled objects.

3. The vehicle dynamic control apparatus according to claim 2, wherein the selecting unit is configured to determine, as the order of the plurality of controlled objects to be controlled, descending order of upper limits of the first controllable ranges of the controlled variable of the plurality of controlled objects.

4. The vehicle dynamic control apparatus according to claim 2, further comprising an urgency determining unit configured to determine whether degree of urgency of dynamic control of the vehicle is higher in priority than comfort, wherein:
    the selecting unit is configured to determine, as the order of the plurality of controlled objects to be controlled, descending order of upper limits of the second controllable ranges of the change in the controlled variable of the plurality of controlled objects.

5. The vehicle dynamic control apparatus according to claim 2, wherein the plurality of controlled objects include at least one of front-wheel steering and rear-wheel steering of the vehicle, the controlled variable of the second parameter of the at least one of the front-wheel steering and the rear-wheel steering is a steering angle of the vehicle corresponding to the at least one of the front-wheel steering and the rear-wheel steering, the change in the controlled variable of the at least one of the front-wheel steering and the rear-wheel steering is a change in the steering angle of the vehicle corresponding to the at least one of the front-wheel steering and the rear-wheel steering, and the vehicle dynamic control apparatus is configured to control the plurality of controlled objects to perform lateral motion control of the vehicle.

6. The vehicle dynamic control apparatus according to claim 2, wherein the plurality of controlled objects include braking of the vehicle, the controlled variable of the second parameter of the braking is torque of each axel of the vehicle, and the change in the controlled variable of the braking is a change in the torque of each axel of the vehicle.

7. The vehicle dynamic control apparatus according to claim 1, further comprising:
a changing unit configured to change, according to at least one of: a control request associated with motion of the vehicle from the application; and vehicle information indicative of current conditions of the vehicle, an availability of the second parameter of at least one controlled object in the plurality of controlled objects,
wherein the selector is configured to determine the order of the plurality of controlled objects to be controlled based on the availability of the second parameter of each of the plurality of controlled objects including a changed availability of the second parameter of the at least one controlled object, and select at least one of the plurality of controlled objects to be controlled in accordance with the determined order.

8. The vehicle dynamic control apparatus according to claim 7, wherein the changing unit comprises:
a first changing section configured to change, according to the control request associated with motion of the vehicle from the application, the availability of the second parameter of a first controlled object, as the at least one controlled object, in the plurality of controlled objects; and
a second changing section configured to change, according to the vehicle information indicative of the current conditions of the vehicle, the availability of the second parameter of a second controlled object, as the at least one controlled object, in the plurality of controlled objects, and
wherein the selector is configured to determine the order of the plurality of controlled objects to be controlled based on the availability of the second parameter of each of the plurality of controlled objects including the changed availability of each of the first and second controlled objects, and select the at least one of the plurality of controlled objects to be controlled in accordance with the determined order.

9. The vehicle dynamic control apparatus according to claim 7, wherein, when the control request represents limitation of deceleration of the vehicle, the changing unit is configured to set an upper limit of deceleration of the vehicle, and change the availability of the second parameter of each of the plurality of controlled objects such that a value of deceleration to be generated by control of each of the plurality of controlled objects is equal to or lower than the upper limit of deceleration of the vehicle.

10. The vehicle dynamic control apparatus according to claim 7, wherein, when the vehicle information represents that a friction of a road surface on which the vehicle is running is equal to or lower than a threshold, the changing unit is configured to reduce the availability of the second parameter of each of the plurality of controlled objects in comparison to the availability of the second parameter of each of the plurality of controlled objects obtained when the friction of the road surface is higher than the threshold.

11. The vehicle dynamic control apparatus according to claim 1, wherein:
the request value of the first parameter for each of the plurality of controlled objects includes a request absolute value of the first parameter for a corresponding one of the plurality of controlled objects, and a request change in the first parameter for a corresponding one of the plurality of controlled objects;
the controllable range of the second parameter of each of the plurality of controlled objects includes an absolute value of the second parameter of a corresponding one of the plurality of controlled objects and a change in the second parameter of a corresponding one of the plurality of controlled objects; and
the comparator is configured to:
compare the request absolute value of the first parameter for each of the plurality of controlled objects with the absolute value of the second parameter of a corresponding one of the plurality of controlled objects; and
compare the request change in the first parameter for each of the plurality of controlled objects with the change in the second parameter of a corresponding one of the plurality of controlled objects.

12. The vehicle dynamic control apparatus according to claim 11, wherein:
the application sends, to the vehicle dynamic control apparatus, a request mode selected in a plurality of request modes determined for the vehicle; and
the selecting unit is configured to correct the order of the plurality of controlled objects to be controlled according to the selected request mode sent from the application and the result of the comparison by the comparator.

* * * * *